(12) United States Patent  
Bharadwaj et al.

(10) Patent No.: US 10,187,314 B2  
(45) Date of Patent: Jan. 22, 2019

(54) TECHNIQUES FOR SIGNAL EXTENSION SIGNALING

(71) Applicant: QUALCOMM Incorporated, San Diego, CA (US)

(72) Inventors: Arjun Bharadwaj, Poway, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 15/159,505

(22) Filed: May 19, 2016

(65) Prior Publication Data

US 2016/0345202 A1   Nov. 24, 2016

Related U.S. Application Data

(60) Provisional application No. 62/165,848, filed on May 22, 2015, provisional application No. 62/170,059, filed on Jun. 2, 2015.

(51) Int. Cl.

| | | |
|---|---|---|
| *H04Q 7/00* | (2006.01) | |
| *H04L 12/841* | (2013.01) | |
| *H04L 1/18* | (2006.01) | |
| *H04L 1/00* | (2006.01) | |
| *H04L 5/00* | (2006.01) | |
| *H04L 27/26* | (2006.01) | |
| *H04W 84/12* | (2009.01) | |

(52) U.S. Cl.
CPC ............ *H04L 47/28* (2013.01); *H04L 1/0041* (2013.01); *H04L 1/0042* (2013.01); *H04L 1/1861* (2013.01); *H04L 5/0053* (2013.01); *H04L 5/0092* (2013.01); *H04L 27/2602* (2013.01); *H04W 84/12* (2013.01)

(58) Field of Classification Search
CPC ..... H04L 47/28; H04L 1/0042; H04L 1/0041; H04L 27/2602; H04L 5/0092; H04L 5/0053; H04L 1/1861; H04W 84/12
USPC .......................................... 370/328, 329, 330
See application file for complete search history.

(56) References Cited

U.S. PATENT DOCUMENTS

2015/0349995 A1* 12/2015 Zhang .................. H04L 5/0048
375/295
2015/0365263 A1* 12/2015 Zhang .................. H04L 1/0057
375/295

(Continued)

FOREIGN PATENT DOCUMENTS

WO   WO-2011/060326 A1   5/2011
WO   WO-2015/191901 A1   12/2015

OTHER PUBLICATIONS

U.S. Appl. No. 62/148,456.*

(Continued)

*Primary Examiner* — Chuong T Ho
(74) *Attorney, Agent, or Firm* — Arent Fox, LLP and Qualcomm Incorporated

(57) ABSTRACT

Various aspects are provided related to techniques for signal extension (SE) signaling. A signal extension (SE) duration for a data unit can be identified from a set of at least three possible SE durations. A single signaling bit in the data unit can be used to indicate the identified SE duration from the set of at least three possible SE durations to a receiver of the data unit. The data unit can be output for transmission to the receiver.

64 Claims, 17 Drawing Sheets

(56) References Cited

U.S. PATENT DOCUMENTS

| | | | | |
|---|---|---|---|---|
| 2015/0365266 A1* | 12/2015 | Zhang | ............... | H04L 1/0057 370/330 |
| 2016/0337153 A1* | 11/2016 | Seok | ............... | H04L 27/2602 |
| 2017/0019281 A1* | 1/2017 | Zhang | ............... | H04L 1/0057 |
| 2018/0006860 A1* | 1/2018 | Zhang | ............... | H04L 1/0057 |
| 2018/0091349 A1* | 3/2018 | Lin | ............ | H04L 27/26 |
| 2018/0248727 A1* | 8/2018 | Zhang | ............... | H04L 1/0057 |

OTHER PUBLICATIONS

International Search Report and Written Opinion—PCT/US2016/033535—ISA/EPO—dated Oct. 6, 2016. 14 pages.

Ramamurthy R, (Marvell Semiconductor): TGn LB129 CID 8097 8098 ; 11-08-0805-01-000n-tgn-1b129-cid-8097-8098 m IEEE Draft; 11-08-0805-01-000N-TGN-LB129-CID-8097-8098 , IEEE-SA Mentor, Piscataway, NJ USA, vol. 802.11n, No. 1, Jul. 13, 2008 (Jul. 13, 2008), pp. 1-15, XP017680978, [retrieved on Jul. 13, 2008].

Zhang H., "HE PHY Padding and Packet Extension; 11-15-0810-01-00ax-he-phy-padding-and-packet-extension," IEEE Draft; Nov. 15, 0810-01-00AX-HE-PHY-PADDING-AND-PACKET-EXTENSION, IEEE-SA Mentor, Piscataway, NJ USA, vol. 802.11ax, No. 1, Sep. 14, 2015 (Sep. 14, 2015), pp. 1-46, XP068098035 [ retrieved on Sep. 14, 2015] slides 12 to 18, 24.

* cited by examiner

| $a$ | Ratio of useful bits in last symbols(s) | Signal Extension (when present) |
|---|---|---|
| 1 | ~0.25 | 4μs |
| 2 | ~0.5 | 8μs |
| 3 | ~0.75 | 12μs |
| 4 | 1 | 16μs |

TECHNIQUES FOR SIGNAL EXTENSION SIGNALING

CLAIM OF PRIORITY UNDER 35 U.S.C. § 119

The present Application for patent claims priority to Provisional Application No. 62/165,848 entitled "TECHNIQUES FOR SIGNAL EXTENSION SIGNALING" filed May 22, 2015, and Provisional Application No. 62/170,059 entitled "TECHNIQUES FOR SIGNAL EXTENSION SIGNALING" filed Jun. 2, 2015, which are assigned to the assignee hereof and hereby expressly incorporated by reference herein for all purposes.

BACKGROUND

The present disclosure relates generally to telecommunications, and specifically to techniques for signal extension signaling.

The deployment of wireless local area networks (WLANs) in the home, the office, and various public facilities is commonplace today. Such networks typically employ a wireless access point (AP) that connects a number of wireless stations (STAs) in a specific locality (e.g., home, office, public facility, etc.) to another network, such as the Internet or the like. A set of STAs can communicate with each other through a common AP in what is referred to as a basic service set (BSS). Nearby BSSs may have overlapping coverage areas and such BSSs may be referred to as overlapping BSSs or OBSSs.

In order to address the desire for greater data throughput using WLANs (e.g., Wi-Fi networks), different approaches are being considered. For example, in the IEEE 802.11ax Wi-Fi standard, a larger number of tones are processed and decoded when compared to earlier or legacy Wi-Fi standards (e.g., IEEE 802.11ac). The larger number of tones allows more data to be transmitted in the same bandwidth and time period.

The processing of signals with a larger number of tones may result in receiver devices having to perform additional processing on frames or data units (e.g., packet layer convergence protocol (PLCP) protocol data units (PPDUs)) than what is needed to handle legacy frames or data units that use fewer tones. The additional processing may cause the receiver devices to take more time to process and decode the data units. There is therefore a desire for improvements in wireless communications that accommodate for the added time consumed by those receiver devices processing data units for networks with greater data throughput.

SUMMARY

In one aspect, a method for signaling in wireless communications may include identifying a signal extension (SE) duration for a data unit from a set of at least three possible SE durations (e.g., five possible SE durations), using a single signaling bit in the data unit to indicate the identified SE duration from the set of at least three possible SE durations to a receiver of the data unit, and outputting the data unit for transmission to the receiver. In other aspects, various apparatuses and/or non-transitory computer-readable medium corresponding to this method are also described.

In another aspect, a method for signaling in wireless communications may include receiving a data unit from a transmitter device, identifying a single signaling bit in the data unit that indicates an SE duration selected for the data unit, and using the single signaling bit to determine which SE duration from a set of at least three possible SE durations (e.g., five possible SE durations) has been selected for the data unit. In other aspects, various apparatuses and/or non-transitory computer-readable medium corresponding to this method are also described.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Figure 1:
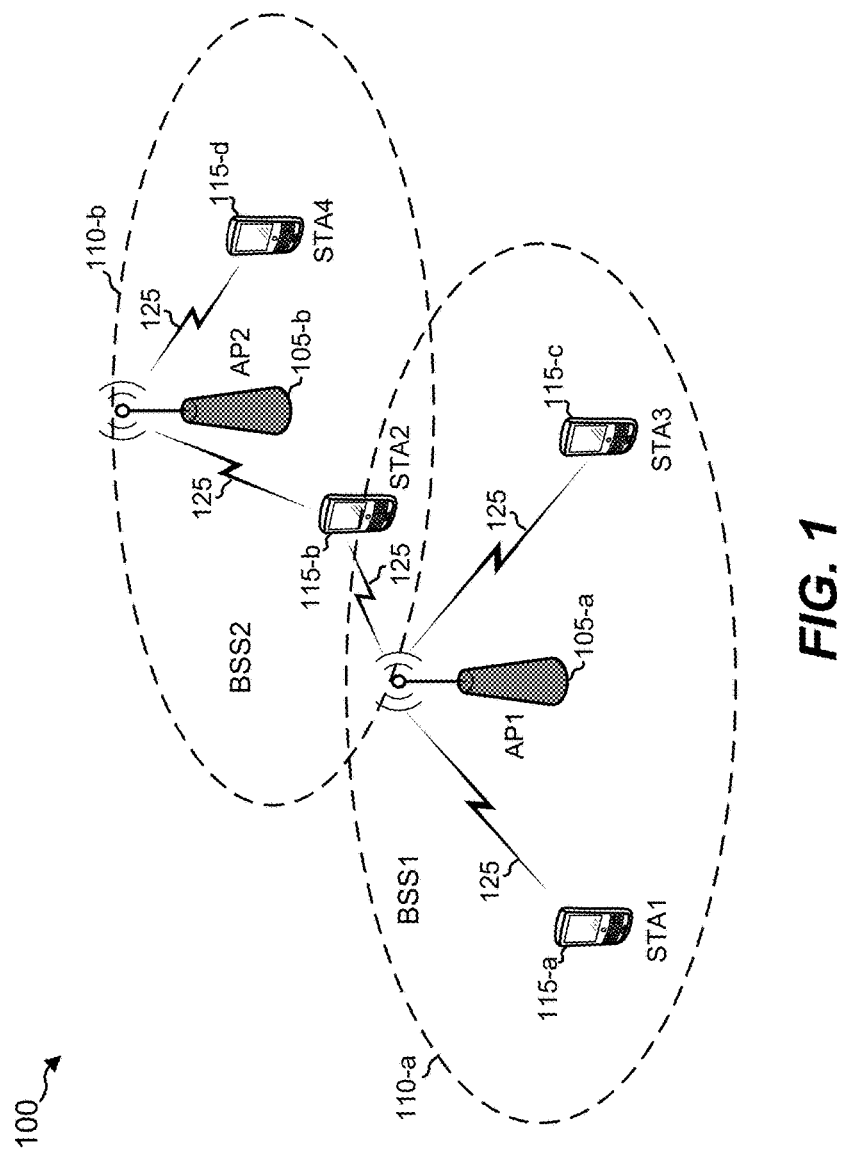
FIG. 1 is a conceptual diagram illustrating an example of a wireless local area network (WLAN) deployment.

Various concepts will be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details. However, it will be apparent to those skilled in the art that these concepts may be practiced without these specific details. In some instances, well known structures and components are shown in block diagram form in order to avoid obscuring the various concepts presented throughout this disclosure.

The present disclosure provides various aspects related to techniques for signal extension signaling in single user and multi-user scenarios. To address the desire for greater data throughput using WLANs networks, the IEEE 802.11ax Wi-Fi standard uses a number of tones that is four (4) times the number of tones used in the legacy IEEE 802.11ac Wi-Fi standard. With a greater number of tones comes increased complexity at a receiver device processing data units having the larger number of tones. The receiver device, however, has to process a received data unit and generate a response to the received data unit under IEEE 802.11ax in the same amount of time as it would have under the legacy IEEE 802.11ac. That is, the receiver device has a turnaround time to generate a response (e.g., ACK, NACK, or other type of response) in IEEE 802.11ax of a short interframe space (SIFS) duration, or 16 microseconds (μs), even though it now has to process four times the number of tones.

To alleviate this additional processing complexity on the receiver device, signal extension (SE) schemes are generally being considered. The term "signal extension" may be used interchangeably with the term "frame extension" (or FE), "packet extension" (or PE), or similar terms, however, "signal extension" (or SE) is mainly used throughout this disclosure. Signal extension may refer to the extension of a duration of a data unit (e.g., one or more packets) or frame by adding a waveform to the end of the data unit or frame (see e.g., SE 230 in FIG. 2). By having a data unit extended or increased in this way, a receiver device can complete the processing of the data unit and provide a response to an extended data unit within a desired duration, such as a SIFS duration (e.g., 16 microseconds (μs) in IEEE 802.11ax. In other words, the receiver device can have the duration of the signal extension in addition to the SIFS duration to perform the data unit processing and the generation of an appropriate response.

The determination of the scenarios in which signal extension is to be used for a data unit and by how much should the data unit be extended may be based, at least in part, on various considerations, such as whether a modulation and coding scheme (MCS) exceeds a predetermined threshold, a portion of useful bits in the last symbol of the data unit, etc. In an example, based on determining that signal extension is to be used for a particular data unit and the amount or duration of the signal extension that is to be added to the end of the data unit, the transmitter device (e.g., an AP) can signal the signal extension information to the receiver device (e.g., an STA) for the receiver device to know how much of the received data is to be decoded (e.g., when to stop decoding the received data unit) and to allow the receiver time to complete processing. In multi-user cases, the transmitter device can signal extension information to multiple receiver devices.

Some proposed signaling schemes for signal extension rely on a number of bits that provide enough resolution for the receiver device to determine the duration of the signal extension applied by the transmitter device. For example, when there are five possible signal extension durations that can be applied to a data unit, one proposed signaling scheme uses three bits (e.g., eight distinct values) to clearly identify and signal to a receiver device which one of the five possible signal extension durations has been selected at the transmitter device for the particular data unit. Using fewer than three bits in this proposed scheme would not work because the number of distinct values would be less than five. For example, using two bits would only provide four distinct values and all five possible signal extension durations could not be signaled. In another example, using a single bit would only provide two distinct values and all five possible signal extension durations could not be signaled.

The present disclosure provides for a signaling scheme for signal extension that can use a single signaling bit (also referred to as a disambiguation bit or ambiguity bit) to identify and signal to a receiver device which one of five possible signal extension durations has been selected at the transmitter device for a particular data unit. Using the single-bit scheme described in this disclosure instead of the proposed three-bit scheme described above can result in significant benefits. One reason is that signaling bits are included in a preamble of the data unit and the preamble is not transmitted at a high data rate in part to maintain compatibility with legacy devices. For example, the preamble in many cases is transmitted using the lowest MCS, with code rate of ½, using convolutional code, and using binary phase shift keying (BPSK) modulation. Moreover, in at least some implementations, multiple-input multiple-output (MIMO) and/or spatial multiplexing techniques are not used to transmit the preamble. Therefore, each additional bit in the preamble could potentially take up to several microseconds to be transmitted. Because a preamble is used with each data unit transmitted, even reducing the number of bits in the preamble by a single bit, let alone two bits, can result in significant improvements in transmission efficiency. Aspects of a single-bit scheme for signal extension signaling are described in more detail below. Moreover, the single-bit scheme for signal extension signaling is applicable for both single user and multi-user scenarios.

FIG. 1 is a conceptual diagram 100 illustrating an example of a wireless local area network (WLAN) deployment in connection with various techniques described herein for signal extension signaling. The WLAN may include one or more access points (APs) and one or more mobile stations (STAs) associated with a respective AP. In this example, there are two APs deployed: AP1 105-*a* in basic service set 1 (BSS1) and AP2 105-*b* in BSS2, which may referred to as an OBSS. AP1 105-*a* is shown having at least three associated STAs (STA1 115-*a*, STA2 115-*b*, and STA3 115-*c*) and coverage area 110-*a*, while AP2 105-*b* is shown having at least two associated STAs (STA2 115-*b* and STA4 115-*d*) and coverage area 110-*b*. In the example of FIG. 1, the coverage area of AP1 105-*a* overlaps part of the coverage area of AP2 105-*b* such that STA2 115-*b* is within the overlapping portion of the coverage areas. The number of BSSs, APs, and STAs, and the coverage areas of the APs described in connection with the WLAN deployment of FIG. 1 are provided by way of illustration and not of limitation. Moreover, aspects of the various techniques described herein for signal extension signaling may be based on at least portions of the WLAN deployment of FIG. 1.

The APs (e.g., AP1 105-*a* and AP2 105-*b*) shown in FIG. 1 are generally fixed terminals that provide backhaul services to STAs within its coverage area or region. In some applications, however, the AP may be a mobile or non-fixed terminal. The STAs (e.g., STA1 115-*a*, STA2 115-*b*, STA3 115-*c*, and STA4 115-*d*) shown in FIG. 1, which may be fixed, non-fixed, or mobile terminals, utilize the backhaul services of their respective AP to connect to a network, such as the Internet. Examples of an STA include, but are not limited to: a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the backhaul services of an AP. An STA may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP may also be referred to as: a base station, a base transceiver station, a radio base station, a radio transceiver, a transceiver function, or any other suitable terminology. The various concepts described throughout this disclosure are intended to apply to all suitable wireless apparatus regardless of their specific nomenclature.

Each of STA1 115-*a*, STA2 115-*b*, STA3 115-*c*, and STA4 115-*d* may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-*a* and AP2 105-*b* can include software applications and/or circuitry to enable associated STAs to connect to a network via communications links 125. The APs can send frames to their respective STAs and receive frames from their respective STAs to communicate data and/or control information (e.g., signaling).

Each of AP1 105-*a* and AP2 105-*b* can establish a communications link 125 with an STA that is within the coverage area of the AP. Communications links 125 can comprise communications channels that can enable both uplink and downlink communications. When connecting to an AP, an STA can first authenticate itself with the AP and then associate itself with the AP. Once associated, a communications link 125 can be established between the AP and the STA such that the AP and the associated STA can exchange frames or messages through a direct communications channel.

While aspects for performing signal extension signaling are described in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), Hiper-LAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout this disclosure for signal extension signaling may be applicable to any suitable wireless network regardless of the coverage range and the wireless access protocols utilized.

Figure 2:
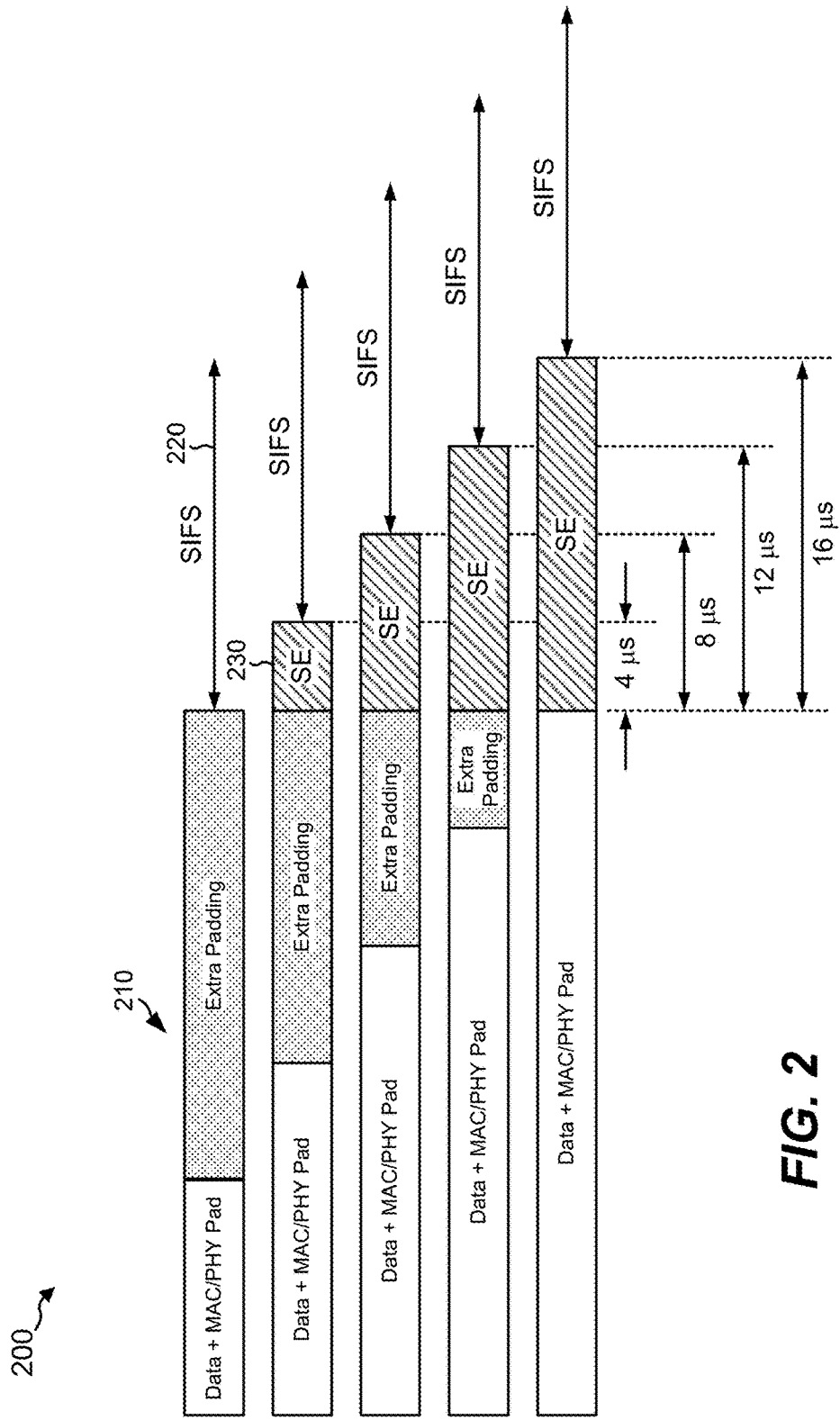
FIG. 2 is a conceptual diagram illustrating an example of a signal extension scheme.

FIG. 2 is a conceptual diagram 200 illustrating an example of a signal extension scheme. As noted above, signal extension or SE may be used to alleviate the processing burden that comes when a receiver device processes a greater number of tones in IEEE 802.11ax compared to the number of tones in legacy IEEE 802.11ac operations. The signal extension is implemented by, for example, adding or applying a SE 230 waveform to the end of a data unit or frame 210. The signal extension can take several values (i.e., can have different durations). In the example of FIG. 2, there are shown five possible signal extension durations or values associated with the five data units shown. From the top data unit to the bottom data units these signal extension values or durations can be, respectively: 0 $\mu$s, 4 $\mu$s, 8 $\mu$s, 12 $\mu$s, and 16 $\mu$s. Other implementations may use more than five possible signal extension durations, and/or may use signal extension durations that vary from the values shown in FIG. 2. The signal extension added to a data unit may be different from the MAC/PHY padding applied as part of the encoding process. Moreover, the signal extension added to a data unit may also be different from the additional or extra padding bits that are added to useful bits in the last symbol of the data unit as a filler. Various aspects of padding in connection with signal extension applications are described in more detail below.

In the bottom data unit shown in FIG. 2, a receiver device may have as much as 32 $\mu$s (e.g., 16 $\mu$s from signal extension and 16 $\mu$s from SIFS) to complete the processing of a received data unit and to generate (and/or communicate) any response triggered by the data unit. This amount of time should now be sufficient in view of improved receiver processing capabilities for IEEE 802.11ax-compatible receiver devices.

As noted above, based on determining that signal extension is to be used for a particular data unit and the amount or duration of the signal extension that is to be added to the end of the data unit, a transmitter device can signal the signal extension information to the receiver device (or receiver devices) for the receiver device to determine how and/or when to stop decoding the received data unit.

Figure 3A:
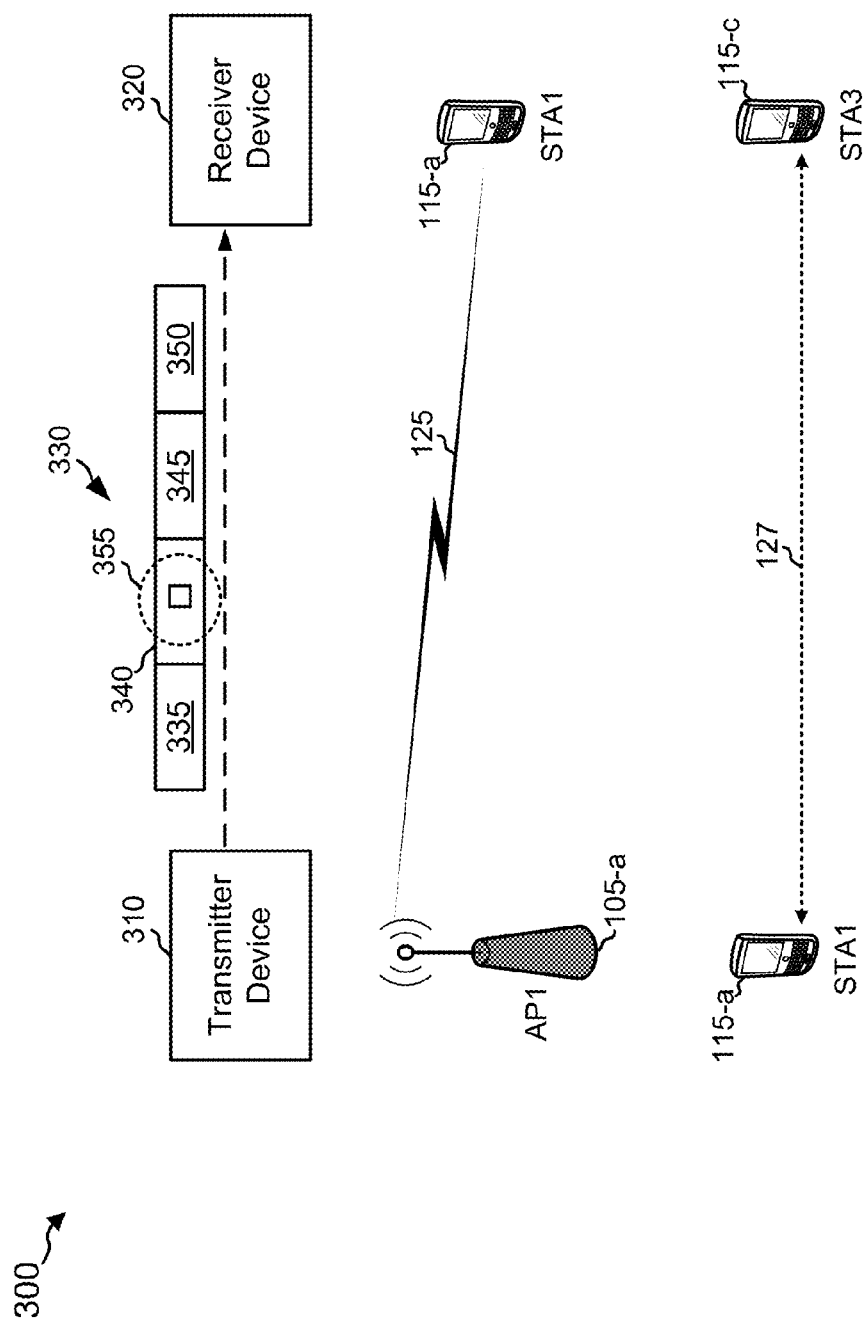
FIG. 3A is a conceptual diagram illustrating an example of signal extension signaling from a transmitter device to a receiver device.

FIG. 3A is a conceptual diagram 300 illustrating an example of signal extension signaling from a transmitter device 310 to a receiver device 320. In one example based on the WLAN deployment of FIG. 1, the transmitter device 310 can be AP1 105-*a* and the receiver device 320 can be the STA1 115-*a*. In this example, the AP1 105-*a* determines that signal extension is to be applied to a data unit (e.g., data unit 330) and the duration of the signal extension to be applied. The AP1 105-*a* then signals (e.g., using a communications link 125) the signal extension to the STA1 115-*a* using the single-bit signaling scheme described herein. The STA1 115-*a* may then decode the data unit by first identifying the signal extension applied from the signaling provided by the AP1 105-*a*.

The data unit 330 is shown to generally include a legacy preamble 335, a high efficiency (HE) preamble 340, which may include the single signaling bit 355 used for the single-bit signaling scheme, data portion 345, and signal extension 350.

In another example of the WLAN deployment of FIG. 1, the transmitter device 310 can be the STA1 115-*a* of FIG. 1 and the receiver device 320 can be the STA3 115-*c* of FIG. 1, which are in a device-to-device communication configuration. In this example, the STA1 115-*a* determines that signal extension is to be applied to a data unit (e.g., data unit 330) and the duration of the signal extension to be applied. The STA1 115-a then signals (e.g., using a device-to-device communications link 127) the signal extension to the STA3 115-c using the single-bit signaling scheme described herein. The STA3 115-c may then decode the data unit by first identifying the signal extension applied from the signaling provided by the STA1 115-a.

Figure 3B:
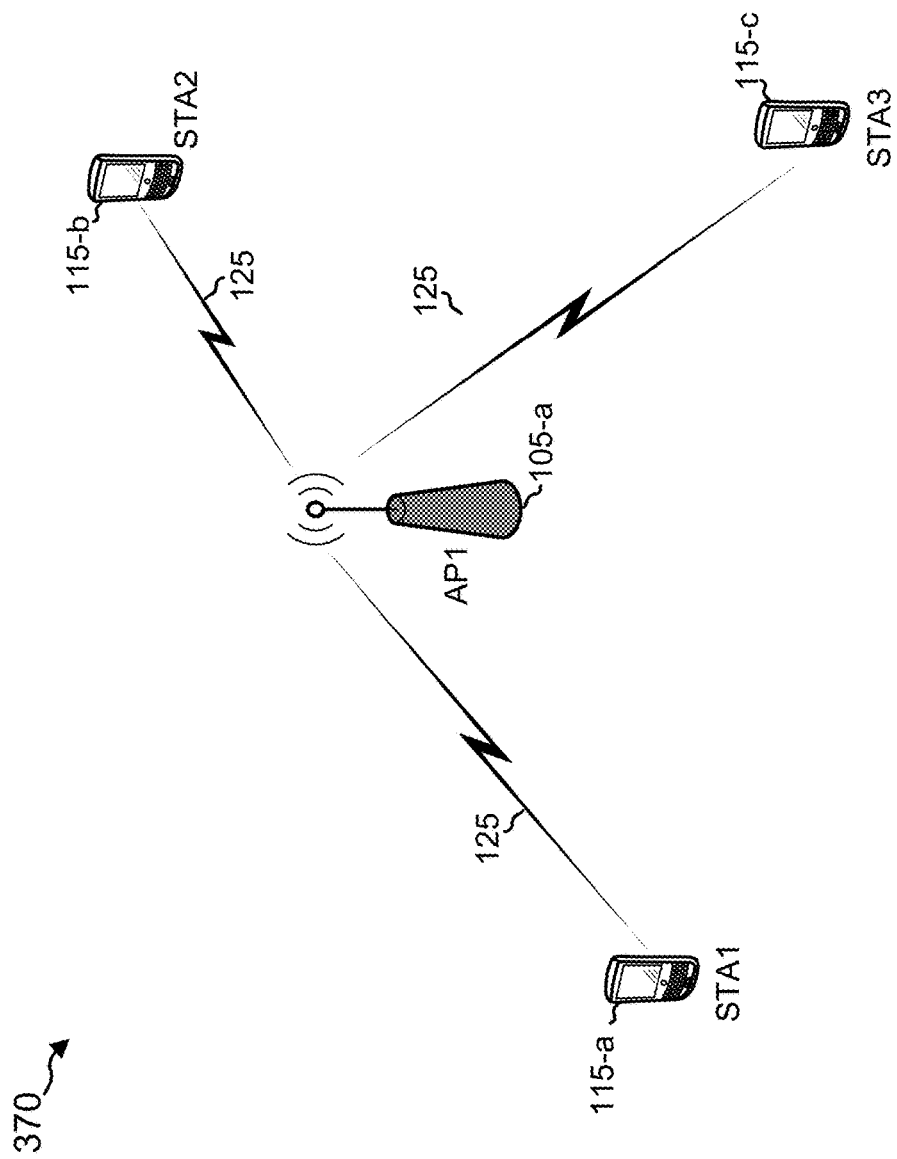
FIG. 3B is a conceptual diagram illustrating an example of signal extension signaling in a multi-user scenario.

The examples illustrated in FIG. 3A represent single user scenarios. FIG. 3B is a conceptual diagram 370 illustrating an example of signal extension signaling in a multi-user scenario. In this example, which is based on the WLAN deployment of FIG. 1, the transmitter device 310 can be AP1 105-a and there is more than one receiver device 320, which can be the STA1 115-a, STA2 115-b, and STA3 1115-c. In this example, the AP1 105-a determines that signal extension is to be applied to a data unit (e.g., data unit 330) for each of the STAs and the duration of the signal extension to be applied. The AP1 105-a then signals (e.g., using a communications link 125) the signal extension to STA1 115-a, STA2 115-b, and STA3 115-c using the single-bit signaling scheme described herein. The STA1 115-a, STA2 115-b, and STA3 115-c may each independently decode their respective data unit by first identifying the signal extension applied from the signaling provided by the AP1 105-a.

The signal extension scheme or mechanism described in this disclosure includes various aspects that enable the use of a single bit signaling scheme for both single user and multi-user scenarios. One such aspect is the use of a two-step padding process. A first step involves a pre-forward error correction (pre-FEC) padding that corresponds to the IEEE 802.11ax medium access control (MAC) padding. This aligns with all four possible predefined boundaries in a symbol (the "a" factor described in more detail below). A second step involves a post-FEC padding to align to symbol boundaries. The signal extension can be applied by the transmitter device (e.g., transmitter device 310) when a certain condition is met. For example, when the data modulation and coding scheme (MCS) is greater than a predetermined threshold, signal extension may be applied. The duration of the signal extension may be based on the amount of post-FEC padding that is applied to a data unit or frame. The duration of the signal extension, as well as the number of data symbols ($N_{sym}$) in a data unit, may be signaled by a transmitter device to a receiver device by using a single signaling bit as described below. As described herein, the use of a single signaling bit may refer to needing only a single bit in addition to other information provided by preambles in the data unit to clarify potential ambiguities in the selection of signal extension. For example, and as described in more detail below, the use of a single signaling bit to indicate the signal extension duration refers to using the single signaling bit to resolve the ambiguity in the number of symbols for the data unit, Nsym, and the signal extension duration. The Nsym and the signal extension duration can be indicated by a combination of the Length field ($L_{LENGTH}$) transmitted through the legacy signal (L-SIG) field and the single signaling bit together.

Figure 4A:
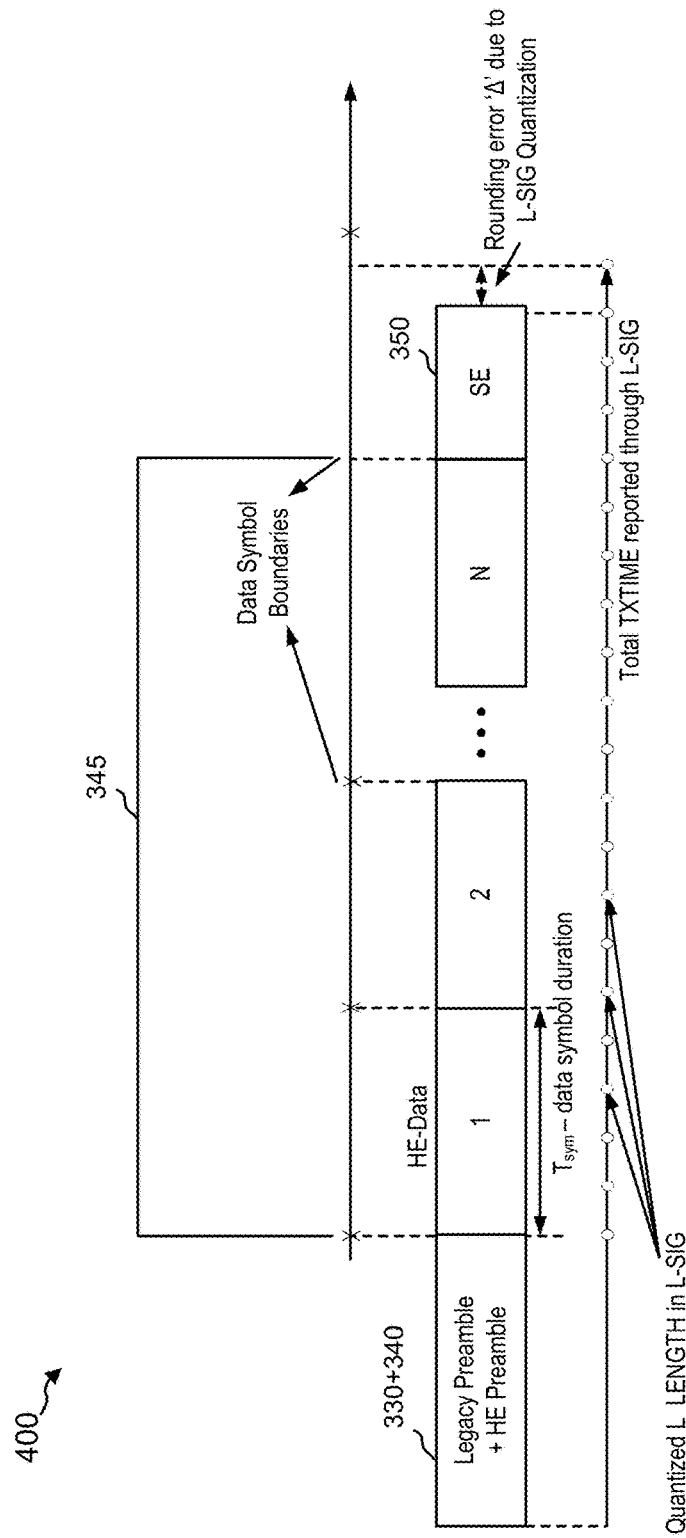
FIG. 4A is a conceptual diagram illustrating an example of a rounding error in signal extension signaling.

FIG. 4A is a conceptual diagram 400 illustrating an example of a rounding error in signal extension signaling. In IEEE 802.11ax, the Length field ($L_{LENGTH}$) transmitted through the legacy signal (L-SIG) field in the legacy preamble can be used to indicated both the data unit (e.g., data unit 330) duration (TXTIME) and the signal extension 350. For example, the number of symbols for the data unit can be computed from the following expression (Equation 1):

$$N_{sym} = \left\lfloor \frac{TXTIME - \text{preamble\_duration}}{T_{sym}} \right\rfloor$$

where $T_{sym}$ (data symbol duration) and the preamble_duration are known at the receiver. Equation 1 above uses a flooring function to obtain $N_{sym}$. In an example, if a number is 3.4, the flooring function rounds the number down to 3. A duration of the signal extension 350 can be computed based on the number of data symbols.

Figure 4B:
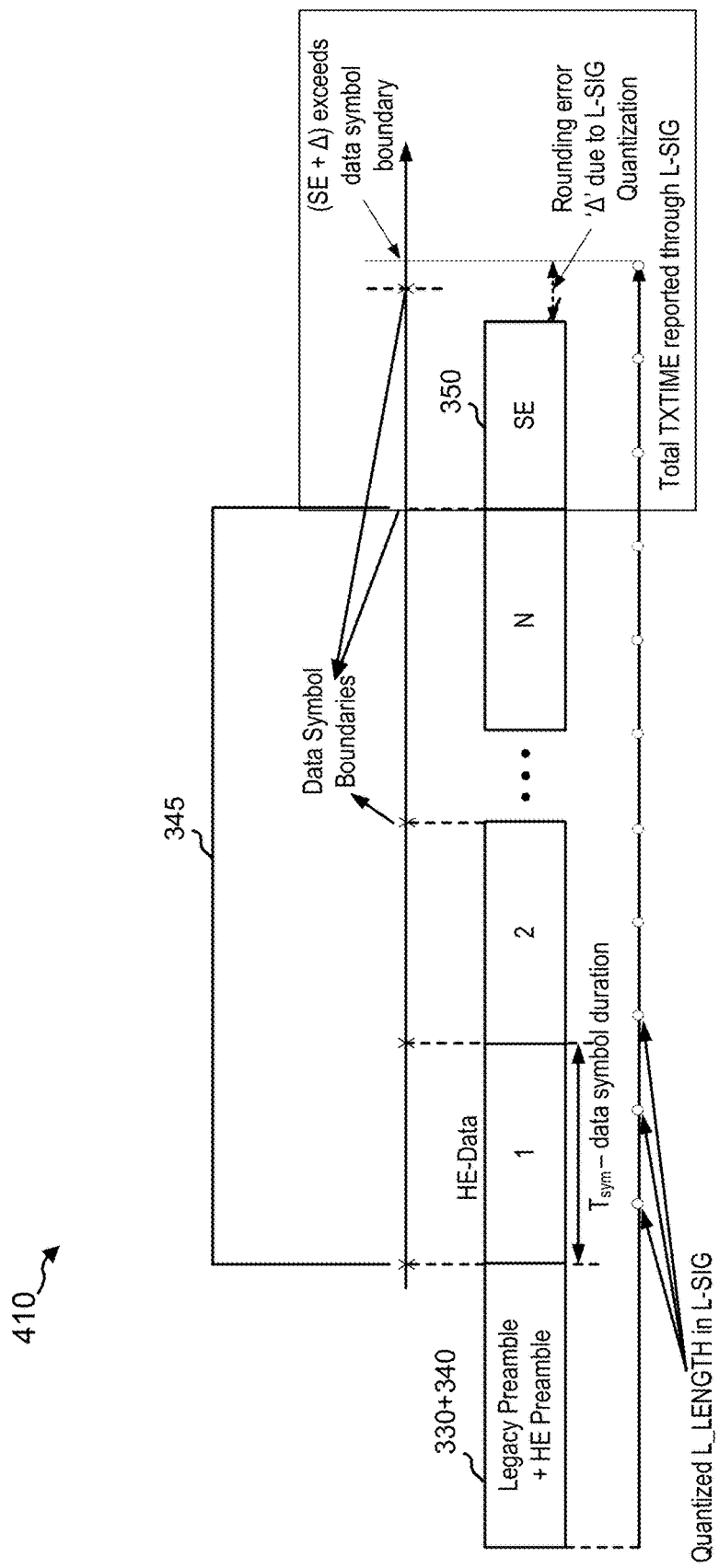
FIG. 4B is a conceptual diagram illustrating an example of an ambiguity in signal extension signaling.

When signal extension is applied to the end of the data unit, as illustrated in FIG. 4A, there may be a rounding error "Δ" caused by $L_{LENGTH}$ quantization. This rounding error may result in ambiguities. FIG. 4B is a conceptual diagram 410 illustrating an example of an ambiguity in signal extension signaling. The signal extension 350 in FIG. 3A can take the values within a set of signal extension durations that include, for example, 0 μs, 4 μs, 8 μs, 12 μs, and 16 μs. When the signal extension duration ($T_{SE}$) is 12 μs or 16 μs, an ambiguity may occur in the computation of the number of data symbols, $N_{sym}$. Because of the rounding error "Δ" caused by $L_{LENGTH}$ quantization, an ambiguity as to the signal extension duration occurs when $T_{SE}+\Delta>T_{sym}$ (data symbol duration), as illustrated to the right of FIG. 4B. In this case, an SE disambiguation bit (also referred to a single signaling bit), may be used to resolve $N_{sym}$ and $T_{SE}$. In one example, by setting the value of the SE disambiguation bit to "0", the bit may be used to indicate whether the $T_{SE}$ is part of a first subset of durations, and by setting the value of the SE disambiguation bit to "1", the bit may be used to indicate whether the $T_{SE}$ is part of a second subset of durations. The SE disambiguation bit may be used to inform the receiver (e.g., the receiver device 320), when the number of data symbols, $N_{sym}$, is to be reduced by one (1) because of the ambiguity.

In order to determine, signal, and use the SE disambiguation bit (or single signaling bit), in one example, the following approach may be used.

The value of the duration of the data unit 330 in number of bytes is determined by the transmitter device 310 based on the time duration of the data unit 330 (TXTIME). At the transmitter device (e.g., AP1 105-a or STA1 115-a), the duration of the data unit 330 (e.g., physical layer convergence protocol (PLCP) data unit (PPDU)) is included in a Length field ($L_{LENGTH}$) of the legacy signal (L-SIG) field of the legacy preamble 335. The duration of the data unit 330, in number of bytes, can be determined by the following expression (Equation 2):

$$L_{LENGTH} = \left\lceil \frac{TXTIME - 20}{4} \right\rceil \times 3 - 3 - m,$$

where $m = 1, 2$ where TXTIME=$T_{L\_PREAMBLE}+T_{HE\_PREAMBLE}+T_{DATA}+T_{SE}$. $T_{L\_PREAMBLE}$ is the duration of the legacy preamble 335 of the data unit 330 and includes a legacy short training field (L-STF), a legacy long training field (L-LTF), and L-SIG. $T_{HE\_PREAMBLE}$ is the duration of the high efficiency (HE) or IEEE 802.11ax preamble 340 of the data unit 330 and includes an RL-SIG, an HE-SIG-A, an HE-SIG-B, an HE-STF, and an HE-LTF. The value m shown can be added in IEEE 802.11ax to ensure that $L_{LENGTH}$ is not exactly a multiple of 3 and therefore can be used to distinguish between IEEE 802.11ax and IEEE 802.11ac transmissions (e.g., auto-detections). Equation 2 above uses a ceiling function with respect to TXTIME—20/4. In an example, if a number is 3.4, the ceiling function rounds the number up to 4. In an example, the value of $T_{DATA}$ is the duration of the data portion 345 of the data unit 330 and can be determined by the transmitter device 310 based on the following expression (Equation 3):

$$T_{DATA} = N_{sym} \times T_{sym} = N_{sym} \times (12.8 + T_{GI})$$

where $N_{sym}$ is the number of data symbols, $T_{sym}$ is the duration of a data symbol, and $T_{GI}$ is the guard time of a data symbol, which can take the values of 0.8 µs, 1.6 µs, or 3.2 µs. As such, the data symbol duration, in an example, can be 13.6 µs (12.8 µs+0.8 µs), 14.4 µs (12.8 µs+1.6 µs), or 16 µs (12.8 µs+3.2 µs). Finally, $T_{SE}$ is the duration of the of the signal extension 350 and can take the values within a set of signal extension durations that may include, for example, 0 µs, 4 µs, 8 µs, 12 µs, and 16 µs.

In IEEE 802.11ac, the transmitter device 310 can provide $L_{LENGTH}$ and TXTIME to allow the receiver device 320 to determine the number of data symbols ($N_{sym}$) to be decoded. In IEEE 802.11ax, for the receiver device 320 to determine the number of data symbols ($N_{sym}$) to be decoded, the transmitter device 310 may provide $L_{\_LENGTH}$, TXTIME, and $T_{SE}$.

According to aspects described herein, for example, the transmitter device 310 may be configured to communicate the duration of the signal extension 350 (e.g., $T_{SE}$) to the receiver device 320 by only using a single signaling bit 355 (e.g., the SE disambiguation bit), which may be indicated in the HE-SIG-A or HE-SIG-B field of the high efficiency preamble 340. This approach can be used to communicate the duration of the signal extension 350 for both single user and multi-user cases. Alternatively, the single signaling bit 355 may be included in another location of the data unit 330. By using only one signaling bit, it is possible to disambiguate the length of the signal extension 350 by indicating whether the signal extension takes values in a first subset of the set of signal extension durations (e.g., 4 µs, 8 µs, and 12 µs), or takes values in a second subset of the set of signal extension durations (e.g., 12 µs and 16 µs). Based on the single signaling bit (e.g., the disambiguation bit devoted to signal extension signaling), and other information available to the receiver of the data unit 330, the receiver is able to uniquely determine which value of the five or more possible values is used for the signal extension 350 of the data unit 330. In another example, another signaling bit (or an additional one or more available bits) may also be used to convey to the receiver device 320 that signal extension 350 is either present or absent, whether the signal extension 350 is of a certain value (e.g., signal extension duration of >16 µs), larger than the value, etc., whether the signal extension 350 is of a specific format (e.g., whether the signal extension 350 is similar to or the same as an LTF or other field transmitted earlier in the frame), etc.

The transmitter device 310 may be configured to set or determine the SE disambiguation bit (e.g., the single signaling bit 355) as follows. In an example, if the condition in expression shown below (Equation 4) is TRUE, then the transmitter device 310 may set the SE disambiguation bit (single signaling bit 355) to "1," or else the transmitter device 310 may set the SE disambiguation bit (single signaling bit 355) to "0."

$$T_{SE} + 4 \times \left( \left\lceil \frac{TXTIME - 20}{4} \right\rceil - \left( \frac{TXTIME - 20}{4} \right) \right) \geq T_{sym}$$

For example, the rounding error "Δ" described above may be computed by:

$$4 \times \left( \left\lceil \frac{TXTIME - 20}{4} \right\rceil - \left( \frac{TXTIME - 20}{4} \right) \right)$$

In an example, the expression $$\frac{TXTIME - 20}{4}$$

can be used to compute $L_{\_LENGTH}$ for L-SIG in IEEE 802.11ax and may already be available to the transmitter device 310. These bit values may be provided by way of illustration and other value assignments may also be used. Once the single signaling bit 355 have been set according to the scheme described above, the transmitter device 310 may include the single signaling bit 355 in, for example, the HE-SIG-A or HE-SIG-B field in the high efficiency preamble 340 of the data unit 330, and may send or transmit the data unit 330 to the receiver device 320 for decoding.

The time duration of the data unit 330 can be determined by the receiver device 320 based on the duration of the data unit 330 in number of bytes ($L_{\_LENGTH}$). That is, at the receiver device 320, the duration RXTIME of the data unit 330 can be computed from $L_{\_LENGTH}$ in the L-SIG as follows (Equation 5):

$$RXTIME = \left\lceil \frac{L_{LENGTH} + m + 3}{3} \right\rceil \times 4 - 20$$

Based on the RXTIME, for example, the number of data symbols, $N_{sym}$, can be computed or determined by the receiver device 320 using the following expression (Equation 6):

$$N_{sym} = \left\lfloor \frac{RXTIME - T_{L\_PREAMBLE} - T_{HE\_PREAMBLE}}{T_{sym}} \right\rfloor - SE_{disambiguation\_bit}$$

where the receiver device 320 identifies the single signaling bit 355 from the data unit 330 and uses it as the SE disambiguation bit. As Equation 6 above illustrates, when SE disambiguation bit=1, the number of data symbols according to the IEEE 802.11ax computation can be reduced by one (1).

Based on the value of $N_{sym}$, for example, the duration of the signal extension 350 (e.g., $T_{SE}$) applied to the data unit 330 can be determined or computed by the receiver device 320 based on the following expression (Equation 7):

$$T_{SE} = \left\lfloor \frac{RXTIME - T_{L\_PREAMBLE} - T_{HE\_PREAMBLE} - (N_{sym} \times T_{sym})}{4} \right\rfloor \times 4$$

Based on $T_{SE}$, for example, the receiver device 320 can decode the data unit 330 because the receiver device 320 can determine where to stop the decoding (e.g., after $T_{L\_PREAMBLE}+T_{HE\_PREAMBLE}+(N_{sym} \times T_{sym})$).

An example of the calculations described above is provided next. For a packet transmission in 80 MHz bandwidth with the following parameters: single stream (1ss), MCS7: 64QAM with 5/6 code rate, LDPC code, GI=0.8 µs such that $T_{sym}$=12.8+0.8=13.6 µs, 2×LTF, packet size=12640 bytes, $T_{L\_PREAMBLE}$=20 µs, $T_{HE\_PREAMBLE}$=24 µs, and the number of data symbols is 21. In this example, the size of the packet is such that the fraction or ratio of useful bits in the last symbol is 0.75. If the receiver device 320 (e.g., STA) indicates that signal extension is needed for MCS7, 1ss, 80 MHz, then $T_{SE}$=12 µs.

At the transmitter device 310 (e.g., AP), the following calculations can be performed in accordance with Equation 2:

$$TXTIME = T_{L\_PREAMBLE} + T_{HE\_PREAMBLE} + T_{DATA} + T_{SE}$$
$$= 20 + 24 + 21 \times 13.6 + 12 = 341.6 \ \mu s$$
$$L_{LENGTH} = \left\lceil \frac{TXTIME - 20}{4} \right\rceil \times 3 - 3 - 1; \text{assuming } m = 1$$
$$= 239$$

Based on the condition outlined above in Equation 4 to set the signaling bit:

$$T_{SE} + 4 \times \left( \left\lceil \frac{TXTIME}{4} \right\rceil - \left( \frac{TXTIME}{4} \right) \right) = 14.4 \geq T_{sym} = 13.6$$

Since the condition is TRUE, in this example, the SE disambiguation bit (single signaling bit 355) can be set to a value of "1."

At the receiver device 320 (e.g., STA), the following calculations can be performed in accordance with Equations 5 and 6:

$$RXTIME = \left\lceil \frac{L_{LENGTH} + m + 3}{3} \right\rceil \times 4 - 20 = 344 \ \mu s$$

$$N'_{sym} = \left\lfloor \frac{RXTIME - T_{L\_PREAMBLE} - T_{HE\_PREAMBLE}}{T_{sym}} \right\rfloor = \left\lfloor \frac{344 - 20 - 24}{13.6} \right\rfloor = 22 \ \mu s$$

$$N_{sym} = N'_{sym} - 1 = 21$$

For example, the signal extension duration ($T_{SE}$) can be calculated at the receiver device 320 in accordance with Equation 7 as follows:

$$T_{SE} = \left\lfloor \frac{RXTIME - T_{L\_PREAMBLE} - T_{HE\_PREAMBLE} - (N_{sym} \times T_{sym})}{4} \right\rfloor \times 4$$
$$= \left\lfloor \frac{344 - 20 - 24 - (21 \times 13.6)}{4} \right\rfloor \times 4 = 12 \ \mu s$$

In this example, the 12 µs of signal extension duration ($T_{SE}$) applied by the transmitter device 310 (e.g., from a total of at least five different possible signal extension durations) can be identified at the receiver device 320 based on a single signaling bit 355 provided by the transmitter device 310.

While the procedures above have been described from the perspective of a single transmitter and a single receiver (e.g., single user scenario), signal extension signaling techniques for multi-user scenarios can be similarly employed. As described above, there can be a two-step procedure to provide pre-FEC and post-FEC padding to a data unit. The pre-FEC padding can generally be treated like data for decoding purposes, while post-FEC padding can generally be used to align to a symbol boundary in the last symbol of the data unit. This two-step procedure may be performed by the transmitter device 310, for example. The transmitter device 310 may also determine to apply signal extension when data MCS for any of the wireless stations or STAs under consideration in the multi-user scenario is greater than its respective threshold. That is, where one STA is determined to meet this condition, the transmitter device 310 can apply signal extension to all the STAs being considered. While in this example data MCS is the condition being used to determine whether to apply signal extension, other conditions may be used such as data rate, for example. The signal extension for each STA can be based on the respective amount of post-FEC padding that is applied. The transmitter device 310 may identify or determine the maximum signal extension (e.g., the one with the longest duration) from those determined for the STAs and apply that maximum signal extension to all of the STAs. That is, the transmitter device 310 may apply a common signal extension to all of the STAs.

The signal extension indication for multi-user scenarios is also similar to the single user case. For example, the transmitter device 310 (e.g., AP1 105-a in FIG. 1) indicates the signal extension applied through the L-SIG length indication and the SE disambiguation bits (e.g., single signaling bit 355). Each STA can then use this information to independently determine the duration of the signal extension that was applied.

Figure 5:
FIG. 5 is a diagram illustrating an example of a mapping table.

There may be different signal extension examples (e.g., when there is more than one receiver device 320, or STA, receiving signals from transmitter device 310, or AP). Each of these examples relies on a mapping of the signal extension to a factor (a) that indicates a ratio or portion of useful bits in the last symbol (e.g., a last symbol of data portion 345) of a data unit 330. FIG. 5 is a diagram 500 illustrating an example of a table for mapping signal extension durations (e.g., 4 µs, 8 µs, 12 µs, and 16 µs) to values of factor "a" (e.g., 1, 2, 3, and 4), which represent a ratio of useful bits in the last symbol. For example, this table may be used to determine whether a signal extension 350 is present in a received signal and/or a length of the signal extension relative to a determined factor (a) of the data portion 345 of the received signal.

Figure 6A:
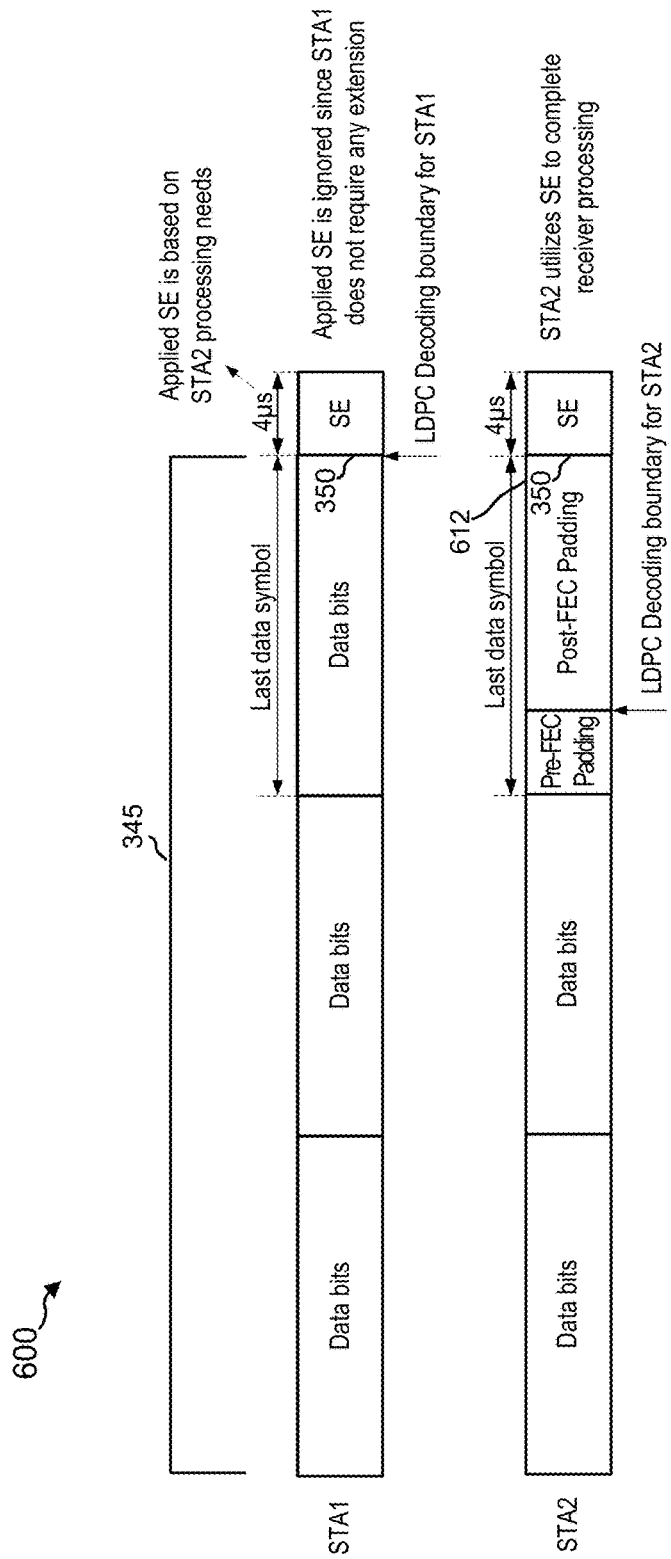
FIG. 6A is a conceptual diagram illustrating a first example of a signal extension signaling multi-user scenario.

FIG. 6A is a conceptual diagram 600 illustrating a first example of a signal extension signaling multi-user scenario. In this example, the first STA (STA1, e.g. as a receiver device 320) may not use a signal extension but the second STA (STA2, e.g., as a receiver device 320) may use a signal extension 350 following data portion 345 of the data unit. The transmitter device 310, for example, may determine to use 4 µs of signal extension for STA2 based on the amount of post-FEC padding 612. In this example, in the multi-user scenario, the transmitter device 310 applies the 4 µs of signal extension to both STA1 and STA2. STA1, after receiving the data unit with the 4 µs of signal extension, can ignore the signal extension added by the transmitter device 310 when processing (e.g., decoding) the data unit. On the other hand, STA2, after receiving the data unit with the 4 µs of signal extension, uses the signal extension to complete processing of the data unit and/or generating/communicating a response for the data unit.

Figure 6B:
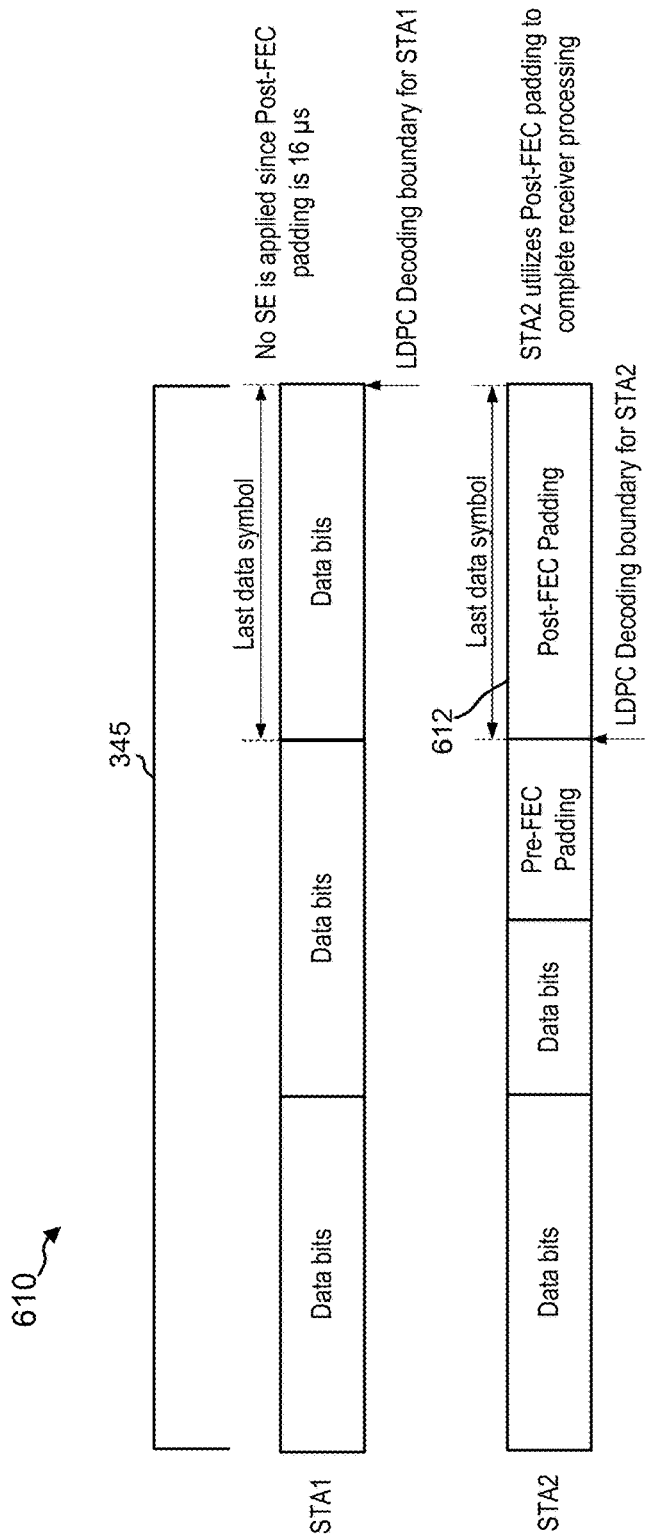
FIG. 6B is a conceptual diagram illustrating a second example of a signal extension signaling multi-user scenario.

FIG. 6B is a conceptual diagram 610 illustrating a second example of a signal extension signaling multi-user scenario. In this example, the first STA (STA1, as a receiver device 320) and the second STA (STA2, as a receiver device 320) may not use a signal extension following data portion 345 of the data unit. The transmitter device 310, for example, may determine that the amount of post-FEC padding 612 for STA2 is 16 µs. In that case, the transmitter device 310 does not apply signal extension to STA1 and STA2 because STA1 may not need it and STA2 can use the 16 µs of post-FEC padding to complete receiver processing.

Figure 6C:
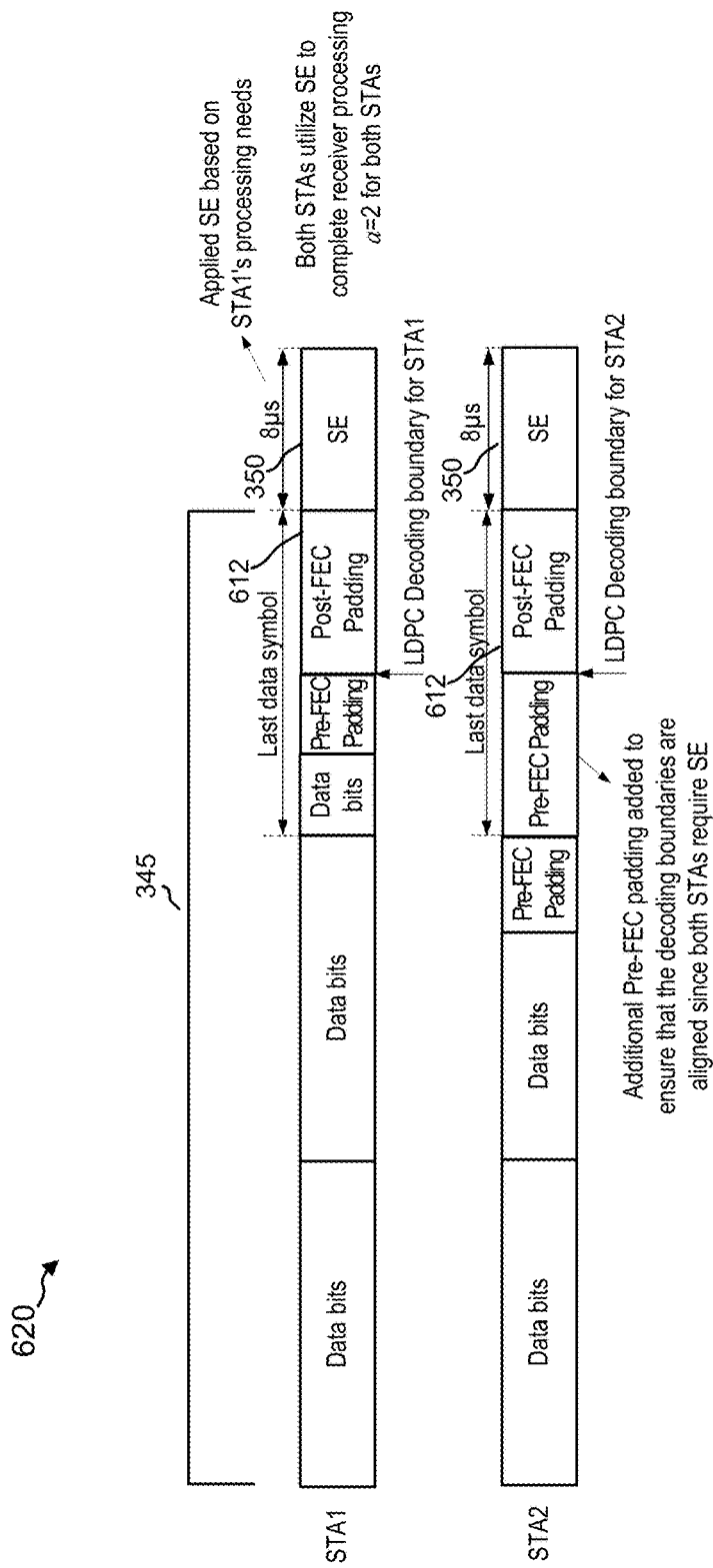
FIG. 6C is a conceptual diagram illustrating a third example of a signal extension signaling multi-user scenario.

FIG. 6C is a conceptual diagram 620 illustrating a third example of a signal extension signaling multi-user scenario. In this example, both the first STA (STA1, e.g., as a receiver device 320) and the second STA (STA2, e.g., as a receiver device 320) may use a signal extension 350 following data portion 345 of the data unit. The transmitter device 310, for example, may determine that STA1 can use 8 µs of signal extension and may apply the 8 µs of signal extension to both STA1 and STA2. Both STA1 and STA2, after receiving the data unit with the 8 µs of signal extension 350, can use the signal extension 350 to complete processing of the data unit, generate and/or communicate a response for the data unit, etc. In this case, based on the mapping table shown in FIG. 5, both STA1 and STA2 can use a factor a=2.

The examples in FIGS. 6A-6C are based on a set of general rules that may be known (e.g., configured at) and used by both the transmitter device (e.g., the transmitter device 310, such as an AP) and the receiver devices (e.g., multiple receiver devices 320, such as STAs) for multi-user scenarios. These rules may be applied or executed at an STA after the STA determines or computes the signal extension duration (e.g., $T_{SE}$) and the number of data symbols ($N_{sym}$). For example, when MCS<a configured threshold (e.g., signal extension is not needed), the STA can process the data symbol assuming that signal extension is absent from the data unit (e.g., a=4). The configured threshold, for example, may be receiver, bandwidth specific, and/or may be configured within a memory of the receiver device 320, received from the transmitter device 310 or other network component, etc. When MCS>the configured threshold (e.g., signal extension is needed), and the signal extension is not 0 µs, receiver device 320 can associate "a" to the signal extension according to the mapping table in FIG. 5 and process the last symbol according to "a." When MCS>the configured threshold (e.g., signal extension is needed), and the signal extension is equal to 0 ρs, receiver device 320 can determine that the last symbol is post-FEC padding, set $N_{sym}=N_{sym}-1$, and set a=4 (e.g., such to process the entire last symbol).

Figure 7:
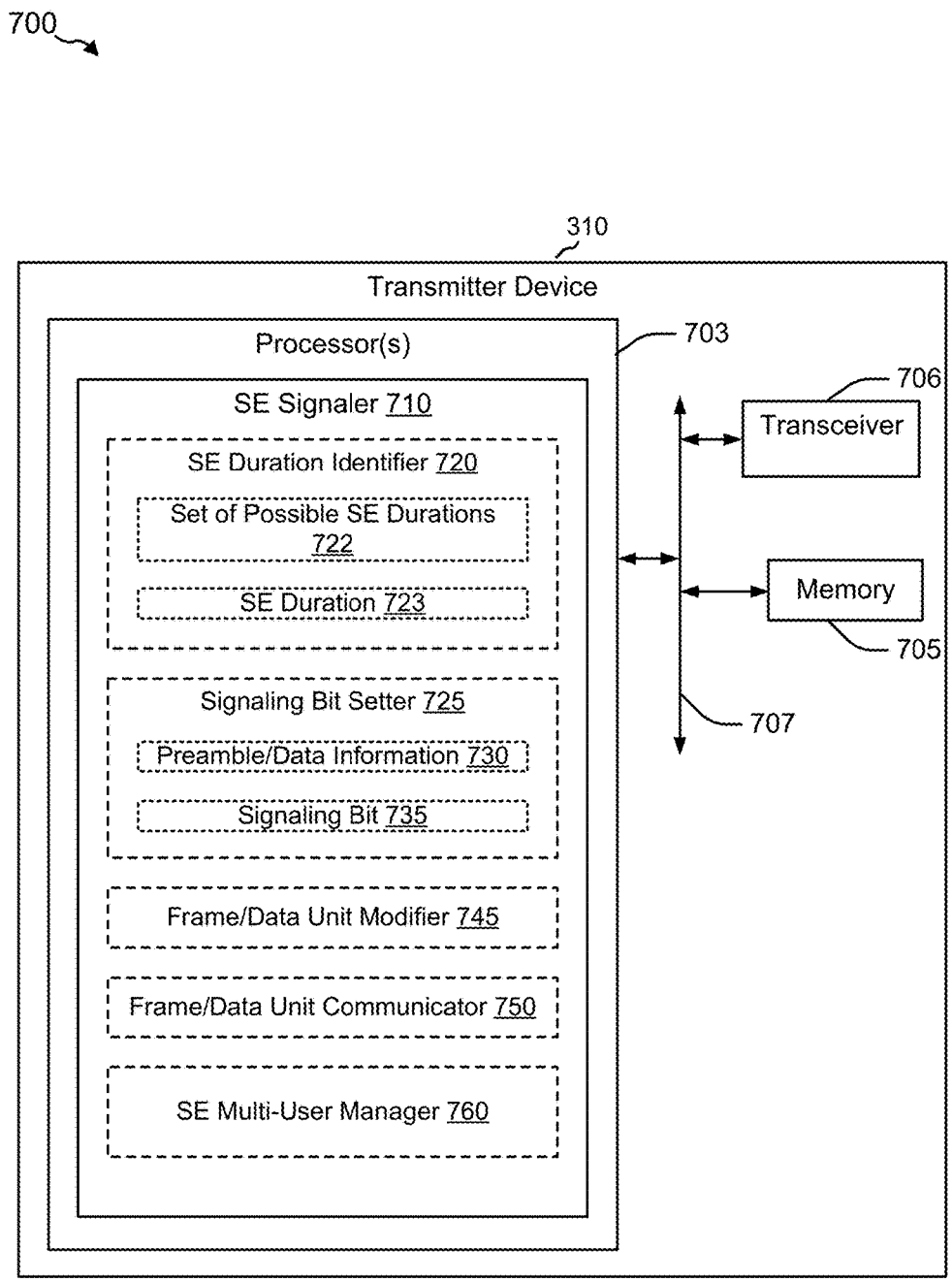
FIG. 7 is a block diagram illustrating an example of a signal extension signaler in a transmitter device.

FIG. 7 is a block diagram 700 illustrating an example of a transmitter device 310. Transmitter device 310 may include one or more processors 703 and/or a memory 705 that may be communicatively coupled, e.g., via one or more buses 707, and may operate in conjunction with or otherwise implement a SE signaler 710, in accordance with aspects described herein. For example, the various operations related to SE signaler 710, and/or its subcomponents, may be implemented or otherwise executed by one or more processors 703 and, in an aspect, can be executed by a single processor, while in other aspects, different ones of the operations may be executed by a combination of two or more different processors. For example, in an aspect, the one or more processors 703 may include any one or any combination of a modem processor, or a baseband processor, or a digital signal processor, or an application specific integrated circuit (ASIC), or a transmit processor, receive processor, or a transceiver processor associated with transceiver 706.

Further, for example, the memory 705 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 703. Moreover, memory 705 or computer-readable storage medium may be resident in the one or more processors 703, external to the one or more processors 703, distributed across multiple entities including the one or more processors 703, etc.

It is to be appreciated that transceiver 706 may be configured to transmit and receive wireless signals through one or more antennas, an RF front end, one or more transmitters, and one or more receivers. In an aspect, transceiver 706 may be tuned to operate at specified frequencies such that transmitter device 310 can communicate at a certain frequency. In an aspect, the one or more processors 703 may configure transceiver 706 to operate at a specified frequency and power level based on a configuration, a communication protocol, etc. to communicate uplink signals and/or downlink signals, respectively, over related uplink or downlink communication channels.

In an aspect, transceiver 706 can operate in multiple bands (e.g., using a multiband-multimode modem, not shown) such to process digital data sent and received using transceiver 706. In an aspect, transceiver 706 can be multiband and be configured to support multiple frequency bands for a specific communications protocol. In an aspect, transceiver 706 can be configured to support multiple operating networks and communications protocols. Thus, for example, transceiver 706 may enable transmission and/or reception of signals based on a specified modem configuration.

In an example, the SE signaler 710 may include one or more components that can be implemented or executed by the processor(s) 703, and/or for which the processor(s) 703 can perform specially configured instructions. The one or more components may include an SE duration identifier 720 configured to identify or select an SE duration 723 (e.g., $T_{SE}$) for a data unit when signal extension is to be applied to the data unit. The SE duration 723 may be identified or selected from a set of possible SE durations 722. The set of possible SE durations 722 may include at least three possible SE durations (e.g., at least four possible SE durations, at least five possible SE durations, or other SE durations). In one example, the set of possible SE durations 722 includes a set of five possible SE durations of 0 µs, 4 µs, 8 µs, 12 µs, and 16 µs. In this example, the set of five possible SE durations may include a first subset having SE durations of 4 µs, 8 µs, and 12 µs, and a second subset having SE durations of 12 µs and 16 µs.

The SE signaler 710 may include a signaling bit setter 725 configured to set a value of a signaling bit 735 (e.g., single signaling bit 355 in FIG. 3A). The SE signaler 710 may use preamble/data information 730 to set the signaling bit 735. The preamble/data information 730 may include, but need not be limited to, TXTIME, $T_{SE}$ (e.g., SE duration 723 from the SE duration identifier 720), and $T_{sym}$.

The SE signaler 710 may include a frame/data unit modifier 745 configured to modify a data unit (e.g., data unit 330 in FIG. 3A) to add a signal extension (e.g., signal extension 350), and/or to include the signaling bit 735 into the data unit (e.g., in an HE-SIG-A or HE-SIG-B field or other field(s) of one or more preambles, such as HE preamble 340). In some instances, the frame/data unit modifier 745 may be used to include pre-FEC and/or post-FEC padding in a data unit or frame, which may also include indicating the factor (a) in the data unit (e.g., in one or more fields of one or more preambles) to represent a ratio of useful bits in the last symbol (which may be based on the post-FEC padding, as described).

The SE signaler 710 may include a frame/data unit communicator 750 configured to output a data unit modified by the frame/data unit modifier 745, where the modified data unit is output for transmission to a receiver device (e.g., the receiver device 320 in FIG. 3A, which may include one or more STAs, as described).

The SE signaler 710 may include an SE multi-user manager 760 configured to perform various aspects of signal extensions techniques as they apply to multi-user scenarios. For example, the SE multi-user manager 760 may determine, along with the SE duration identifier 720, a signal extension to be applied commonly to the STAs in a multi-user scenario. In this regard, the SE multi-user manager 760 may identify a maximum signal extension to be commonly applied.

Figure 8:
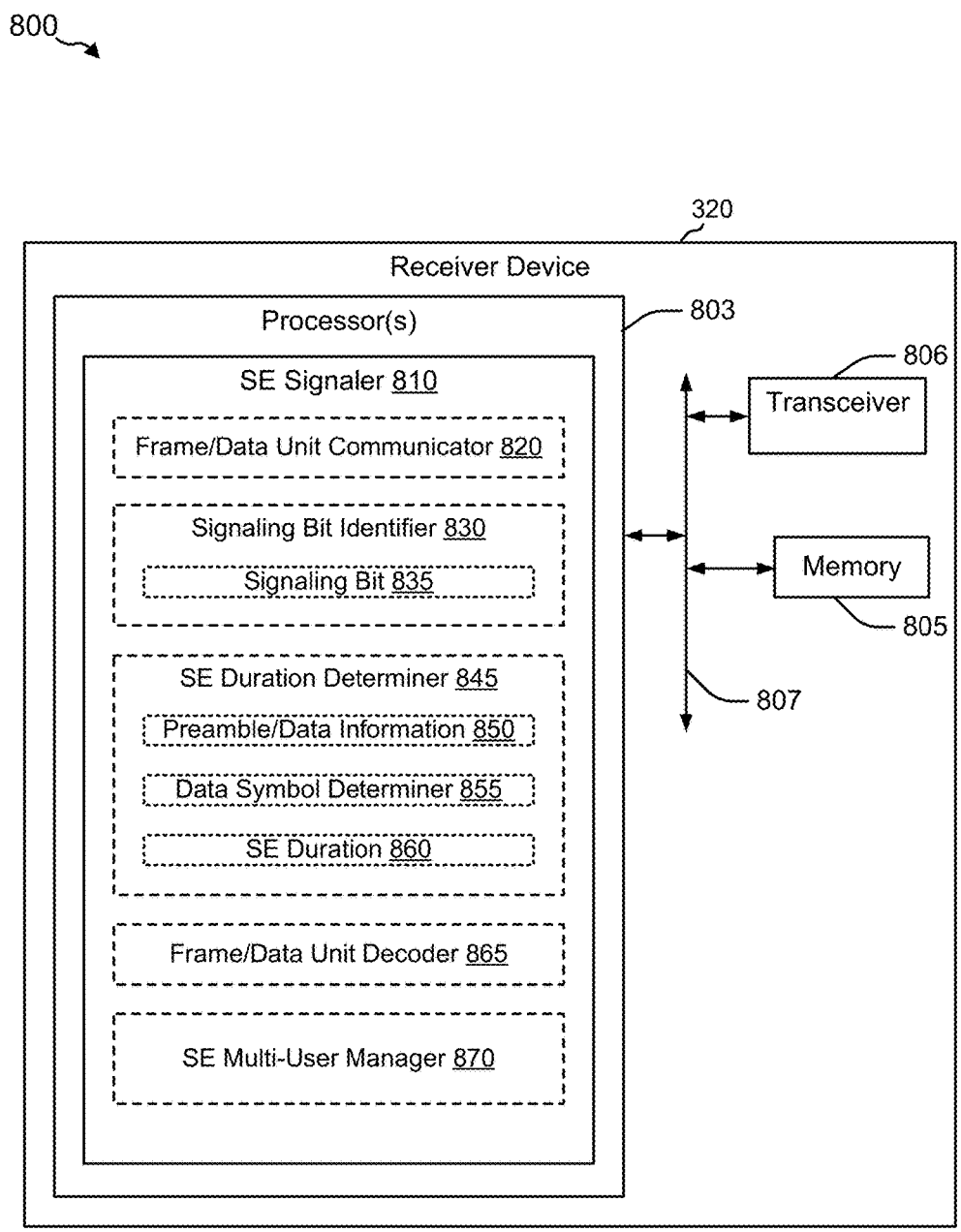
FIG. 8 is a block diagram illustrating an example of a signal extension signaler in a receiver device.

FIG. 8 is a block diagram 800 illustrating an example of a receiver device 320. Receiver device 320 may include one or more processors 803 and/or a memory 805 that may be communicatively coupled, e.g., via one or more buses 807, and may operate in conjunction with or otherwise implement a SE signaler 810, in accordance with aspects described herein. For example, the various operations related to SE signaler 810, and/or its subcomponents, may be implemented or otherwise executed by one or more processors 803 and, in an aspect, can be executed by a single processor, while in other aspects, different ones of the operations may be executed by a combination of two or more different processors. For example, in an aspect, the one or more processors 803 may include any one or any combination of a modem processor, or a baseband processor, or a digital signal processor, or an application specific integrated circuit (ASIC), or a transmit processor, receive processor, or a transceiver processor associated with transceiver 806.

Further, for example, the memory 805 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 803. Moreover, memory 805 or computer-readable storage medium may be resident in the one or more processors 803, external to the one or more processors 803, distributed across multiple entities including the one or more processors 803, etc.

It is to be appreciated that transceiver 806 may be configured to transmit and receive wireless signals through one or more antennas, an RF front end, one or more transmitters, and one or more receivers. In an aspect, transceiver 806 may be tuned to operate at specified frequencies such that receiver device 320 can communicate at a certain frequency. In an aspect, the one or more processors 803 may configure transceiver 806 to operate at a specified frequency and power level based on a configuration, a communication protocol, etc. to communicate uplink signals and/or downlink signals, respectively, over related uplink or downlink communication channels.

In an aspect, transceiver 806 can operate in multiple bands (e.g., using a multiband-multimode modem, not shown) such to process digital data sent and received using transceiver 806. In an aspect, transceiver 806 can be multiband and be configured to support multiple frequency bands for a specific communications protocol. In an aspect, transceiver 806 can be configured to support multiple operating networks and communications protocols. Thus, for example, transceiver 806 may enable transmission and/or reception of signals based on a specified modem configuration.

In an example, the SE signaler 810 may include one or more components that can be implemented or executed by the processor(s) 803, and/or for which the processor(s) 803 can perform specially configured instructions. The one or more components may include a frame/data unit communicator 820 configured to receive a data unit (e.g., the data unit 330 in FIG. 3A) from a transmitter device (e.g., the transmitter device 310 in FIG. 3A).

The SE signaler 810 may include a signaling bit identifier 830 configured to identify a signaling bit 835 (e.g., single signaling bit 355 in FIG. 3A) from the data unit received by the frame/data unit communicator 820. The signaling bit 835 may be identified from the data unit (e.g., in an HE-SIG-A or HE-SIG-B field or other field(s) of one or more preambles, such as HE preamble 340). In another example, the factor (a) can be determined from one or more fields of one or more preambles as well.

The SE signaler 810 may include an SE duration determiner 845 configured to use the signaling bit 835 (e.g., in conjunction with the determined factor (a) of the data unit) to determine which SE duration 860 from a set of possible SE durations has been selected and applied to the data unit by the transmitter device. The SE duration determiner 845 may include a data symbol determiner 855 configured to determine a number of data symbols from which to determine the SE duration 860 (e.g., $T_{SE}$). The data symbol determiner 855 is further configured to determine the first number of data symbols based at least in part on preamble/data information 850 (e.g., RXTIME, $T_{L\_PREAMBLE}$, $T_{HE\_PREAMBLE}$, and $T_{sym}$).

The SE signaler 810 may include a frame/data unit decoder 865 configured to decode the data unit received by the frame/data unit communicator 820 based at least in part on the SE duration 860 (e.g., $T_{SE}$) determined by the SE duration determiner 845. The frame/data unit decoder 865 may include or have access to a mapping table such as the mapping table in FIG. 5, and may use the information in the mapping table to determine which portions of the data unit to decode. Moreover, the frame/data unit decoder 865 may be configured to perform, for example, low-density parity-check (LDPC) decoding.

The various elements, components, or modules described above with respect to the transmitter device 310 in FIG. 7 and the receiver device 320 in FIG. 8 may be implemented in hardware, software, or a combination of hardware and software. For example, at least a portion of the functionality of each of the various elements, components, or modules described above with respect to the transmitter device 310 in FIG. 7 and the receiver device 320 in FIG. 8 can be implemented or performed by a processor (see e.g., processor 1304 in FIG. 13) in connection with instructions or code stored in and/or provided by a computer readable medium or memory (see e.g., computer-readable medium 1306 in FIG. 13). The instructions or code may be programmed to implement the methods shown in FIGS. 9-12 and described herein, such as through use of the equations and functionality for signal extension signaling in single user and multi-user scenarios. Moreover, values, parameters, and/or different types of information handled by the transmitter device 310 in FIG. 7 and the receiver device 320 in FIG. 8 may be stored in local memory to the elements, components, or modules of the transmitter device 310 and the receiver device 320, and/or in other memory such as the computer-readable medium 1306 in FIG. 13.

Figure 9:
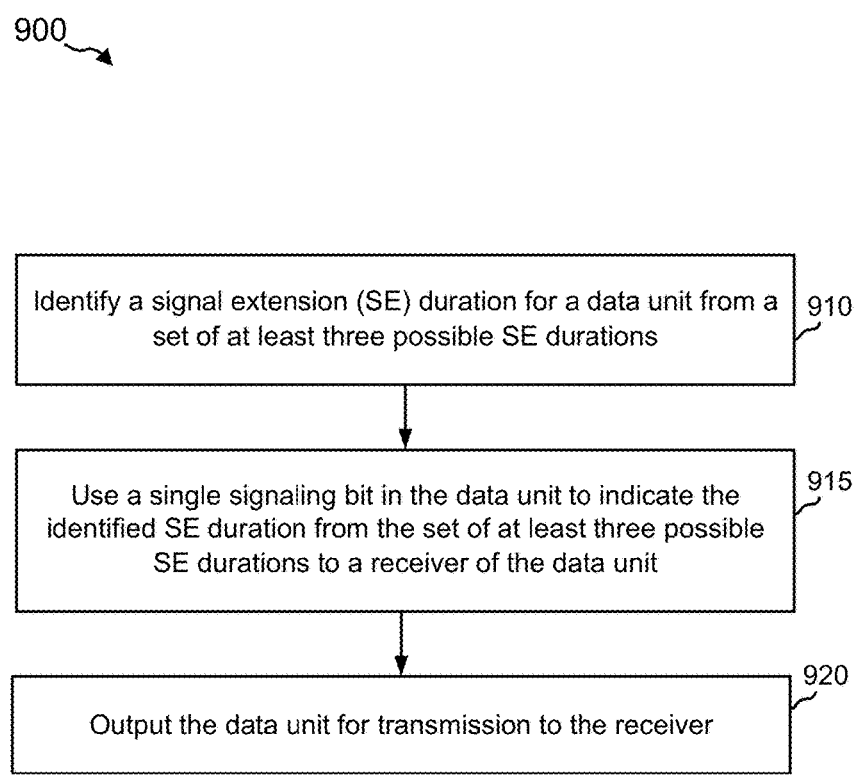
FIG. 9 is a flow diagram illustrating an example of a method for signal extension signaling by a transmitter device.

FIG. 9 is a flow diagram illustrating an example of a method 900 for signal extension signaling by a transmitter device (e.g., the transmitter device 310 in FIGS. 3A and 7). At 910, a signal extension duration for a data unit is identified from a set of at least three possible SE durations (e.g., four possible SE durations, five possible SE durations, etc.). In an example, the SE duration identifier 720 in the SE signaler 710 (FIG. 7), e.g., in conjunction with processor(s) 703, memory 705, transceiver 706, etc., may identify an SE duration 723 from a set of possible SE durations 722.

At 915, a single signaling bit in the data unit may be used to indicate the identified SE duration from the set of at least three possible SE durations to a receiver of the data unit. In an example, the signaling bit setter 725 in the SE signaler 710 (FIG. 7), e.g., in conjunction with processor(s) 703, memory 705, transceiver 706, etc., may be used to a single signaling bit or SE disambiguation bit (e.g., the signaling bit 735) to indicate the SE duration 723 identified by the SE duration identifier 720. The signaling bit setter 725 may perform or execute one or more of Equations 1, 2, 3, and 4, for example, to determine a value for the signaling bit 735. In addition, as described, the signaling bit 735 may be set in a portion of the data unit, such as in one or more fields of a preamble.

At 920, the data unit is output for transmission to the receiver. In an example, the frame/data unit communicator 750 in the SE signaler 710 (FIG. 7), e.g., in conjunction with processor(s) 703, memory 705, transceiver 706, etc., can output a data unit modified by the frame/data unit modifier 745 to include a signal extension added to the end of the data unit and the single signaling bit that indicates the signal extension.

In another aspect of the method 900, the set of at least three possible SE durations includes only five possible SE durations, and the set of five possible SE durations includes durations of 0 μs, 4 μs, 8 μs, 12 μs, and 16 μs.

In another aspect of the method 900, the single signaling bit is included in an HE-SIG-A or HE-SIG-B field of a high efficiency preamble (e.g., preamble 340) associated with the data unit (e.g., data unit 330).

Figure 10:
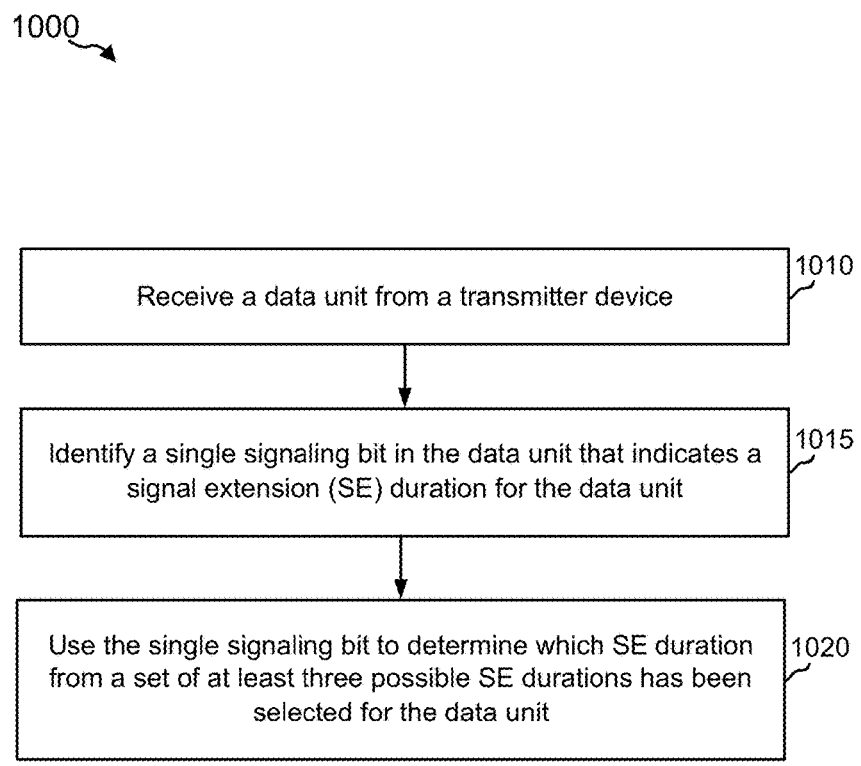
FIG. 10 is a flow diagram illustrating an example of a method for signal extension signaling by a receiver device.

FIG. 10 is a flow diagram illustrating an example of a method 1000 for signal extension signaling by a receiver device (e.g., the receiver device 320 in FIGS. 3A and 8). At 1010, a data unit is received from a transmitter device. In an example, the frame/data unit communicator 820 in the SE signaler 810, e.g., in conjunction with processor(s) 803, memory 805, transceiver 806, etc., receives a data unit from a transmitter device (e.g., the transmitter device 310 in FIGS. 3A and 7).

At 1015, a single signaling bit is identified in the data unit and is used to indicate a signal extension duration for the data unit. In an example, the signaling bit identifier 830 in the SE signaler 810 (FIG. 8), e.g., in conjunction with processor(s) 803, memory 805, transceiver 806, etc., identifies the signaling bit 835 from a data unit received by the frame/data unit communicator 820.

At 1020, the single signaling bit is used to determine which SE duration from a set of at least three possible SE durations (e.g., five possible SE durations) has been selected for the data unit. In one example, the SE duration determiner 845 in the SE signaler 810 (FIG. 8), e.g., in conjunction with processor(s) 803, memory 805, transceiver 806, etc., determines the SE duration 860 based at least in part on the signaling bit 835 identified by the signaling bit identifier 830. For example, SE duration determiner 845 may determine the SE duration 860 based also in part on a received or otherwise determined factor (a), as described. The SE duration determiner 845 may perform or execute one or more of Equations 5, 6, and 7, in an example, to determine the SE duration 860.

In another aspect of the method 1000, the set of at least three possible SE durations includes only five possible SE durations, and the set of five possible SE durations includes durations of 0 μs, 4 μs, 8 μs, 12 μs, and 16 μs.

In another aspect of the method 1000, the single signaling bit is included in an HE-SIG-A or HE-SIG-B field of a high efficiency preamble (e.g., high efficiency preamble 340) associated with the data unit (e.g., data unit 330).

Figure 11:
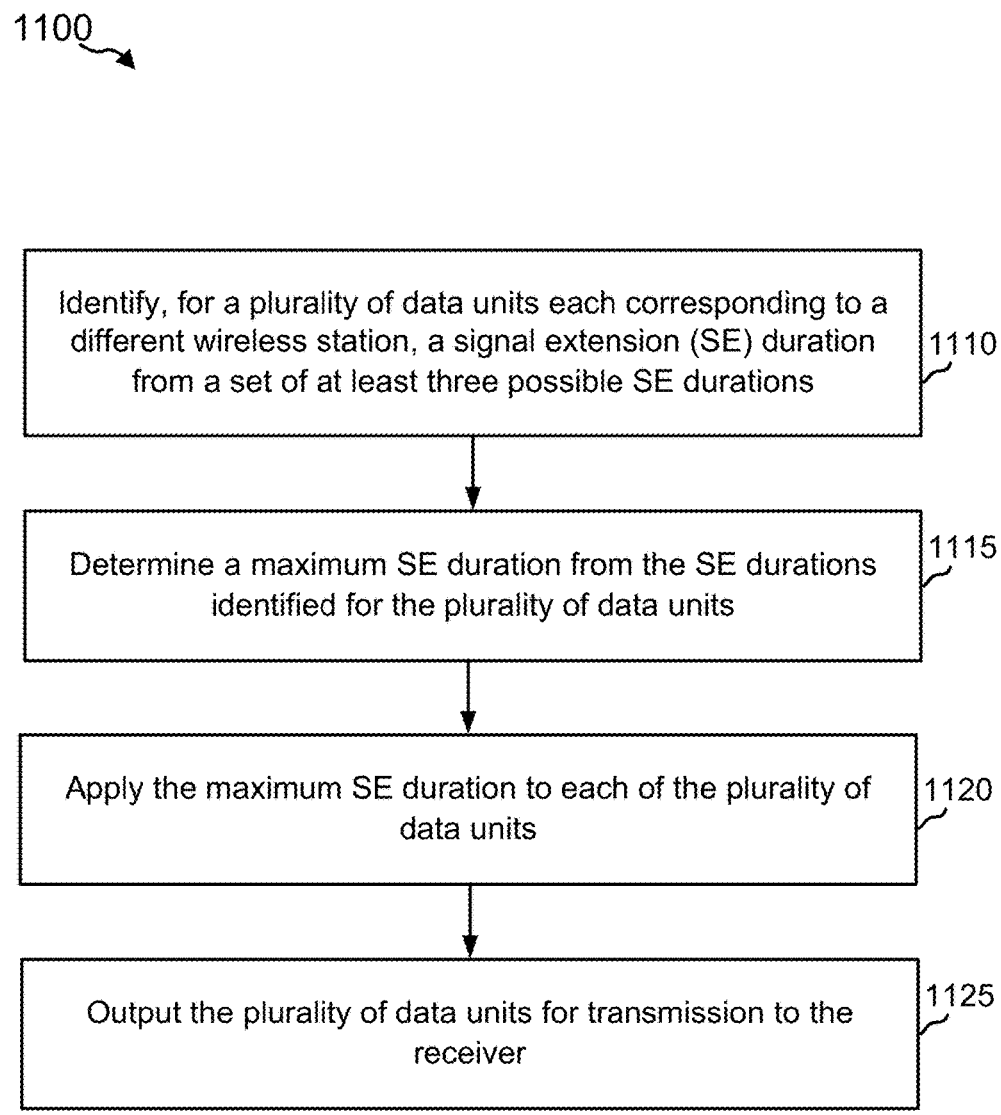
FIG. 11 is a flow diagram illustrating another example of a method for signal extension signaling by a transmitter device.

FIG. 11 is a flow diagram illustrating an example of a method 1100 for signal extension signaling by a transmitter device (e.g., the transmitter device 310 in FIGS. 3A and 7). At 1110, for a plurality of data units each corresponding to a different wireless station, a signal extension duration is identified from a set of at least three possible signal extension durations (e.g., five possible signal extension durations). In one example, the SE duration identifier 720 and/or the SE multi-user manager 760, e.g., in conjunction with processor(s) 703, memory 705, transceiver 706, etc., may be used to identify the signal extension durations.

At 1115, a maximum signal extension duration is determined from the signal extension durations identified for the plurality of data units. In one example, the SE duration identifier 720 and/or the SE multi-user manager 760, e.g., in conjunction with processor(s) 703, memory 705, transceiver 706, etc., may be used to determine the maximum signal extension duration.

At 1120, the maximum signal extension duration may be applied to each of the plurality of data units. In one example, the frame/data unit modifier 745 and/or the SE multi-user manager 760, e.g., in conjunction with processor(s) 703, memory 705, transceiver 706, etc., may be used to apply the maximum signal extension commonly to the plurality of data units.

At 1125, the plurality of data units may be output for transmission to a receiver (e.g., the receiver device 320). In one example, the frame/data unit communicator 750, e.g., in conjunction with processor(s) 703, memory 705, transceiver 706, etc., may be used to output the plurality of data units with the appropriate signal extension.

Figure 12:
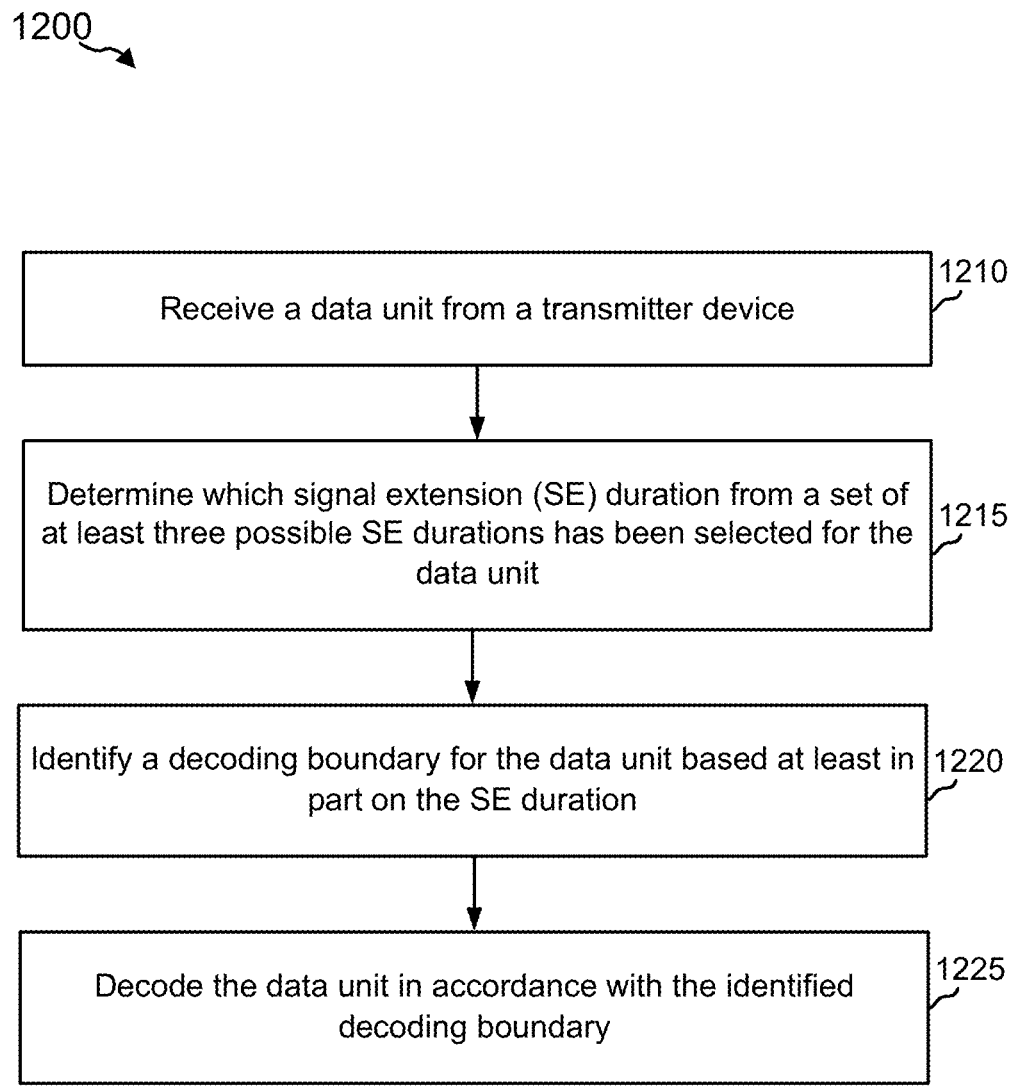
FIG. 12 is a flow diagram illustrating another example of a method for signal extension signaling by a receiver device.

FIG. 12 is a flow diagram illustrating another example of a method 1200 for signal extension signaling by a receiver device (e.g., the receiver device 320 in FIGS. 3A and 8). At 1210, a data unit is received from a transmitter device (e.g., the transmitter device 310). In one example, the frame/data unit communicator 820, e.g., in conjunction with processor(s) 803, memory 805, transceiver 806, etc., may be used to receive the data unit (e.g., the data unit 330).

At 1215, it is determined which signal extension from a set of three possible signal extension durations (e.g., five possible signal extension durations) has been selected for the data unit. In one example, the SE duration determiner 845, e.g., in conjunction with processor(s) 803, memory 805, transceiver 806, etc., may be used to determine the signal extension duration (e.g., SE duration 860).

At 1220, a decoding boundary is identified for the data unit based at least in part on the signal extension duration. In one example, the SE multi-user manager 870 and/or the frame/data unit decoder 865, e.g., in conjunction with processor(s) 803, memory 805, transceiver 806, etc., may be used to identify the decoding boundary.

At 1225, the data unit may be decoded in accordance with the identified decoding boundary. In one example, the frame/data unit decoder 865, e.g., in conjunction with processor(s) 803, memory 805, transceiver 806, etc., may be used to decode the data unit in accordance with the decoding boundary.

Figure 13:
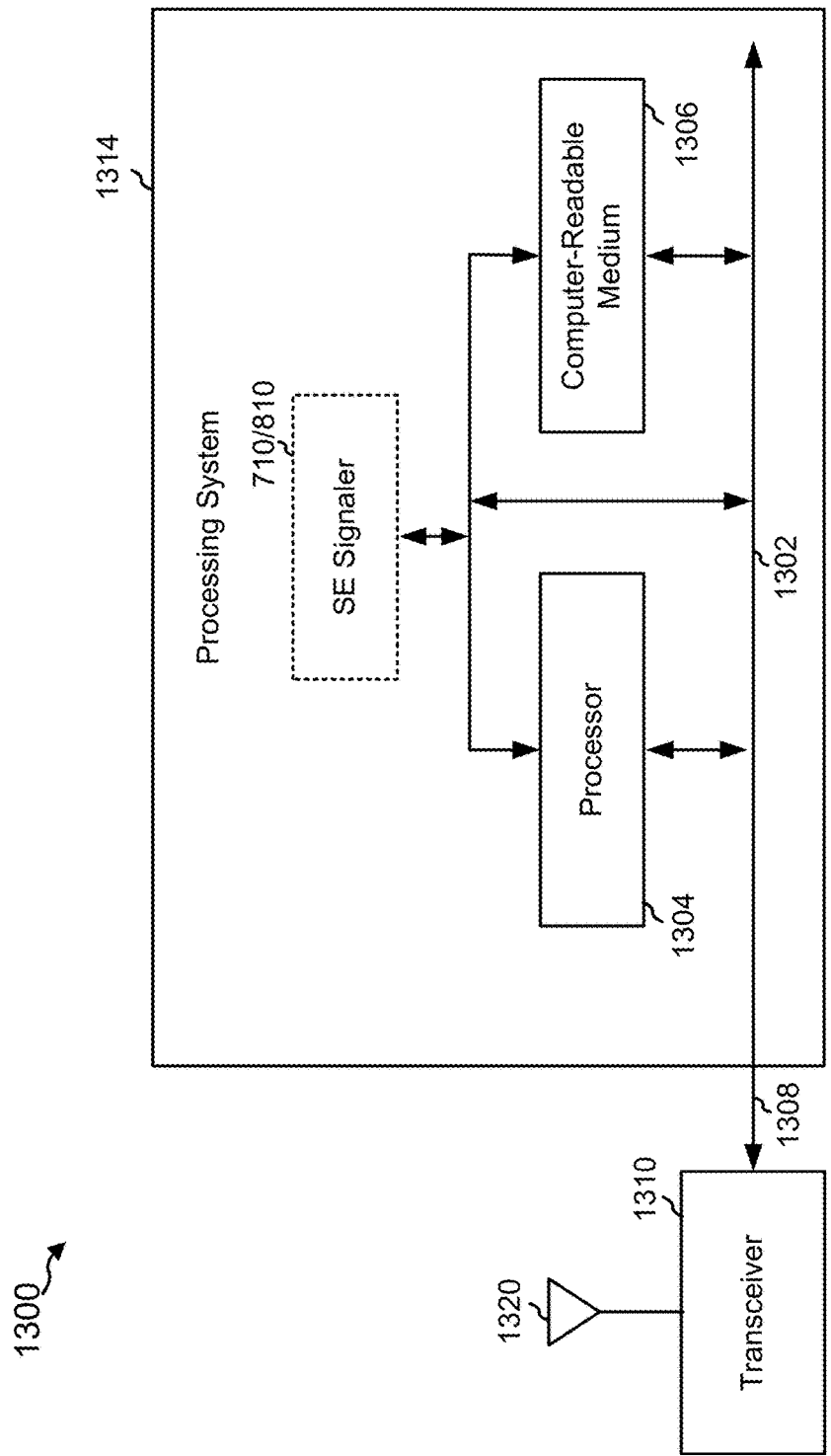
FIG. 13 is a block diagram illustrating an example of a processing system that supports signal extension signaling operations.

FIG. 13 shows a block diagram 1300 illustrating an example of a processing system 1314 that supports signal extension signaling operations. The processing system 1314 may be implemented with a bus architecture, represented generally by the bus 1302. The bus 1302 may include any number of interconnecting buses and bridges depending on the specific application of the processing system 1314 and the overall design constraints. The bus 1302 links together various circuits including one or more processors and/or hardware modules, represented by a processor 1304, an SE signaler 710/810, and a computer-readable medium/memory 1306. The bus 1302 may also link various other circuits such as timing sources, peripherals, voltage regulators, and power management circuits, which are well known in the art, and therefore, will not be described any further.

The processing system 1314 may be coupled to a transceiver 1310 via an interface 1308. The transceiver 1310 is coupled to one or more antennas 1320. The transceiver 1310 may provide a means for communicating with various other apparatus or devices over a transmission medium. The transceiver 1310 may receive a signal from the one or more antennas 1320, may extract information from the received signal, and may provide the extracted information to the processing system 1314, specifically the processor 1304 and/or the SE signaler 710/810. In addition, the transceiver 1310 may receive information from the processing system 1314 and/or the SE signaler 710/810, and based on the received information, may generate a signal to be applied to the one or more antennas 1320. The processing system 1314 includes the processor 1304 coupled to the computer-readable medium/memory 1306, and/or to the SE signaler 710/810, which may be the SE signaler 710 (FIG. 7) when the processing system 1314 is part of a transmitter device and/or the SE signaler 810 (FIG. 8) when the processing system 1314 is part of a receiver device. The processor 1304 is responsible for general processing, including the execution of software stored on the computer-readable medium/memory 1306. The software, when executed by the processor 1004, causes the processing system 1314 to perform the various functions described in the disclosure for signal extension signaling. The computer-readable medium/memory 1306 may also be used for storing data that is manipulated by the processor 1304 when executing software. The SE signaler 710/810 may be a software module running in the processor 1304, resident/stored in the computer readable medium/memory 1306, a hardware module coupled to the processor 1004, or some combination thereof. In some instances, the processor 1304 and the computer readable medium/memory 1306 may be used to perform functions, operations, or features described herein with respect to one or more of the components of the SE signaler 710 (FIG. 7) or the SE signaler 810 (FIG. 8).

For example, SE signaler 710, and/or one or more subcomponents (e.g., SE duration identifier 720, signaling bit setter 725, frame/data unit modifier 745, frame/data unit communicator 750, SE multi-user manager 760, etc.) may include hardware (e.g., one or more processor modules of the one or more processors 1304) and/or computer-readable code or instructions stored in computer-readable medium/memory 1306 and executable by at least one of the one or more processors 1304 to perform the specially configured operations described herein.

In addition, for example, SE signaler 810, and/or one or more subcomponents (e.g., frame/data unit communicator 820, signaling bit identifier 830, SE duration determiner 845, data symbol determiner 855, frame/data unit decoder 865, SE multi-user manager 870, etc.) may include hardware (e.g., one or more processor modules of the one or more processors 1304) and/or computer-readable code or instructions stored in computer-readable medium/memory 1306 and executable by at least one of the one or more processors 1304 to perform the specially configured operations described herein.

In another aspect of the signal extension signaling scenarios, because IEEE 802.11ax includes both single user and orthogonal frequency division multiple access (OFDMA) transmissions (e.g., multi-users), additional rules of the application of signal extension may be implemented. For example, when the resource allocation (RU) size for an STA is <20 MHz, then the signal extension requirements assigned for 20 MHz are applied. Similarly, when 20 MHz<RU size<=40 MHz, then the signal extension requirements assigned for 40 MHz are applied. When 40 MHz<RU size<=80 MHz, then the signal extension requirements assigned for 80 MHz are applied. When 80 MHz<RU size<=160 MHz, then the signal extension requirements assigned for 160 MHz are applied. If multiple RUs are assigned to the same STA (e.g., 5 MHz in 20 MHz band and 10 MHz in 40 MHz band), then the total aggregate size of all the RUs (e.g., 15 MHz) is used to determine the signal extension requirement.

The apparatus and methods have been described in the detailed description and illustrated in the accompanying drawings by various elements comprising blocks, modules, components, circuits, steps, processes, algorithms, and the like. These elements, or any portion thereof, either alone or in combinations with other elements and/or functions, may be implemented using electronic hardware, computer software, or any combination thereof. Whether such elements are implemented as hardware or software depends upon the particular application and design constraints imposed on the overall system. In an aspect, the term "component" as used herein may be one of the parts that make up a system and may be divided into other components.

By way of example, an element, or any portion of an element, or any combination of elements may be implemented with a "processing system" that includes one or more processors. A processor may include a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on transitory or non-transitory computer-readable medium. A non-transitory computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), static RAM (SRAM), dynamic RAM (DRAM), synchronous dynamic RAM (SDRAM); double date rate RAM (DDRAM), read only memory (ROM), programmable ROM (PROM), erasable PROM (EPROM), electrically erasable PROM (EEPROM), a general register, or any other suitable non-transitory medium for storing software.

The various interconnections within a processing system may be shown as buses or as single signal lines. Each of the buses may alternatively be a single signal line, and each of the single signal lines may alternatively be buses, and a single line or bus might represent any one or more of a myriad of physical or logical mechanisms for communication between elements. Any of the signals provided over various buses described herein may be time-multiplexed with other signals and provided over one or more common buses.

The various aspects of this disclosure are provided to enable one of ordinary skill in the art to practice the present invention. Various modifications to examples of implementations presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the examples of implementations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. A method for signaling in wireless communications, comprising:
    identifying a signal extension (SE) duration for a data unit from a set of at least three possible SE durations;
    using a single signaling bit in the data unit, in combination with a length field, to indicate the identified SE duration from the set of at least three possible SE durations to a receiver of the data unit, wherein the single signaling bit is a disambiguation bit, and wherein using the signal signaling bit includes:
        calculating a rounding error; and
        setting the disambiguation bit set to a value based at least in part on the calculated rounding error; and
    outputting the data unit for transmission to the receiver.

2. The method of claim 1, wherein the set of at least three possible SE durations includes five possible SE durations, and wherein the five possible SE durations includes durations of 0 µs, 4 µs, 8 µs, 12 µs, and 16 µs.

3. The method of claim 1, wherein using the single signaling bit to indicate the identified SE duration comprises setting the single signaling bit to at least one of a first value to indicate that the SE duration is part of a first subset of the set of at least three possible SE durations, or a second value to indicate that the SE duration is part of a second subset of the set of at least three possible SE durations.

4. The method of claim 3, wherein at least one possible SE duration value of the set of at least three possible SE durations is included in both the first subset and the second sub set.

5. The method of claim 3, wherein the first subset includes SE durations of 4 µs, 8 µs, and 12 µs, and wherein the second subset includes SE durations of 12 µs and 16 µs.

6. The method of claim 1, wherein the single signaling bit is included in an HE-SIG-A or an HE-SIG-B field of a high efficiency preamble associated with the data unit.

7. The method of claim 1, further comprising:
    identifying, for a one or more of data units each corresponding to one or more different wireless stations, one or more different SE durations from the set of at least three possible SE durations;
    determining a maximum SE duration from the identified SE duration and the one or more different SE durations identified for the one or more data units, wherein identifying the SE duration for the data unit is based on the maximum SE duration;
    applying the maximum SE duration to the data unit and the one or more data units; and
    outputting the one or more data units for transmission to one or more receivers.

8. The method of claim 7, further comprising using the single signaling bit in each of the one or more data units to indicate the maximum SE duration.

9. The method of claim 1, further comprising:
    adding the rounding error to the identified SE duration to get a sum;
    identifying a value that represents a duration of a symbol;
    comparing the sum to the value; and
    wherein setting the disambiguation bit comprises setting the disambiguation bit to a value of one in response to the sum being greater than the value, or a value of zero in response to the sum being less than the value.

10. An apparatus for signaling in wireless communications, comprising:
    a memory that stores signal extension signaling instructions; and
    a processor coupled with the memory and configured to execute the signal extension signaling instructions to:
        identify a signal extension (SE) duration for a data unit from a set of at least three possible SE durations;
        use a single signaling bit in the data unit, in combination with a length field, to indicate the identified SE duration from the set of at least three possible SE durations to a receiver of the data unit, wherein the single signaling bit is a disambiguation bit, and wherein using the signal signaling bit includes:
calculating a rounding error; and
setting the disambiguation bit set to a value based at least in part on the calculated rounding error; and
output the data unit for transmission to the receiver.

11. The apparatus of claim 10, wherein the set of at least three possible SE durations includes five possible SE durations, and wherein the five possible SE durations includes durations of 0 μs, 4 μs, 8 μs, 12 μs, and 16 μs.

12. The apparatus of claim 10, wherein the processor is configured to execute the signal extension signaling instructions to use the single signaling bit to indicate the identified SE duration by setting the single signaling bit to at least one of a first value to indicate that the SE duration is part of a first subset of the set of at least three possible SE durations, or a second value to indicate that the SE duration is part of a second subset of the set of at least three possible SE durations.

13. The apparatus of claim 12, wherein at least one possible SE duration value of the set of at least three possible SE durations is included in both the first subset and the second subset.

14. The apparatus of claim 12, wherein the first subset includes SE durations of 4 μs, 8 μs, and 12 μs, and wherein the second subset includes SE durations of 12 μs and 16 μs.

15. The apparatus of claim 10, wherein the single signaling bit is included in an HE-SIG-A or an HE-SIG-B field of a high efficiency preamble associated with the data unit.

16. The apparatus of claim 10, wherein the processor is further configured to execute the signal extension signaling instructions to:
identify, for a one or more of data units each corresponding to one or more different wireless stations, one or more different SE durations from the set of at least three possible SE durations;
determine a maximum SE duration from the identified SE duration and the one or more different SE durations identified for the one or more data units, wherein the processor is configured to execute the signal extension signaling instructions to identify the SE duration for the data unit based on the maximum SE duration;
apply the maximum SE duration to the data unit and the one or more data units; and
output the one or more data units for transmission to one or more receivers.

17. The apparatus of claim 16, wherein the processor is further configured to execute the signal extension signaling instructions to use the single signaling bit in each of the one or more data units to indicate the maximum SE duration.

18. The apparatus of claim 10, wherein the processor is configured to execute the signal extension signaling instructions to:
add the rounding error to the identified SE duration to get a sum;
identify a value that represents a duration of a symbol;
compare the sum to the value; and
set the disambiguation bit set to a value of one in response to the sum being greater than the value, or a value of zero in response to the sum being less than the value.

19. An apparatus for signaling in wireless communications, comprising:
means for identifying a signal extension (SE) duration for a data unit from a set of at least three possible SE durations;
means for using a single signaling bit in the data unit, in combination with a length field, to indicate the identified SE duration from the set of at least three possible SE durations to a receiver of the data unit, wherein the single signaling bit is a disambiguation bit, and wherein the means for using the signal signaling bit includes:
means for calculating a rounding error; and
means for setting the disambiguation bit set to a value based at least in part on the calculated rounding error; and
means for outputting the data unit for transmission to the receiver.

20. The apparatus of claim 19, wherein the set of at least three possible SE durations includes five possible SE durations, and wherein the five possible SE durations includes durations of 0 μs, 4 μs, 8 μs, 12 μs, and 16 μs.

21. The apparatus of claim 19, wherein the means for using the single signaling bit to indicate the identified SE duration sets the single signaling bit to at least one of a first value to indicate that the SE duration is part of a first subset of the set of at least three possible SE durations, or a second value to indicate that the SE duration is part of a second subset of the set of at least three possible SE durations.

22. The apparatus of claim 21, wherein at least one possible SE duration value of the set of at least three possible SE durations is included in both the first subset and the second subset.

23. The apparatus of claim 21, wherein the first subset includes SE durations of 4 μs, 8 μs, and 12 μs, and wherein the second subset includes SE durations of 12 μs and 16 μs.

24. The apparatus of claim 19, wherein the single signaling bit is included in an HE-SIG-A or an HE-SIG-B field of a high efficiency preamble associated with the data unit.

25. A non-transitory computer-readable medium storing executable code for signaling in wireless communications, comprising:
code for identifying a signal extension (SE) duration for a data unit from a set of at least three possible SE durations;
code for using a single signaling bit in the data unit, in combination with a length field, to indicate the identified SE duration from the set of at least three possible SE durations to a receiver of the data unit, wherein the single signaling bit is a disambiguation bit, and wherein the code for using the signal signaling bit includes:
code for calculating a rounding error; and
code for setting the disambiguation bit set to a value based at least in part on the calculated rounding error; and
code for outputting the data unit for transmission to the receiver.

26. The non-transitory computer-readable medium of claim 25, wherein the set of at least three possible SE durations includes five possible SE durations, and wherein the five possible SE durations includes durations of 0 μs, 4 μs, 8 μs, 12 μs, and 16 μs.

27. The non-transitory computer-readable medium of claim 25, wherein the code for using the single signaling bit to indicate the identified SE duration sets the single signaling bit to at least one of a first value to indicate that the SE duration is part of a first subset of the set of at least three possible SE durations, or a second value to indicate that the SE duration is part of a second subset of the set of at least three possible SE durations.

28. The non-transitory computer-readable medium of claim 27, wherein at least one possible SE duration value of the set of at least three possible SE durations is included in both the first subset and the second subset.

29. The non-transitory computer-readable medium of claim 27, wherein the first subset includes SE durations of 4 μs, 8 μs, and 12 μs, and wherein the second subset includes SE durations of 12 μs and 16 μs.

30. The non-transitory computer-readable medium of claim 25, wherein the single signaling bit is included in an HE-SIG-A or an HE-SIG-B field of a high efficiency preamble associated with the data unit.

31. A method for signaling in wireless communications, comprising:
receiving a data unit from a transmitter device;
identifying a single signaling bit in the data unit that indicates a signal extension (SE) duration selected for the data unit; and
using the single signaling bit, in combination with a length field, to determine which SE duration from a set of at least three possible SE durations has been selected for the data unit,
wherein the single signaling bit is a disambiguation bit, and wherein using the single signaling bit includes:
calculating a number of data symbols for the data unit;
determining that the disambiguation bit has a value of one; and
reducing the calculated number of data symbols by one based on the value of the disambiguation bit.

32. The method of claim 31, wherein using the single signaling bit to determine the SE duration comprises:
determining a number of data symbols for the data unit based at least in part on the single signaling bit; and
determining the SE duration based at least in part on the number of data symbols.

33. The method of claim 31, wherein the set of at least three possible SE durations includes five possible SE durations, and wherein the five possible SE durations includes durations of 0 μs, 4 μs, 8 μs, 12 μs, and 16 μs.

34. The method of claim 31, wherein the single signaling bit is included in an HE-SIG-A or an HE-SIG-B field of a high efficiency preamble associated with the data unit.

35. The method of claim 31, further comprising:
identifying a decoding boundary for the data unit based at least in part on the SE duration; and
decoding the data unit in accordance with the identified decoding boundary.

36. The method of claim 35, wherein identifying the decoding boundary for the data unit comprises mapping the SE duration to a factor indicating a portion of useful bits in a last symbol of the data unit.

37. The method of claim 31, wherein the selected SE duration is determined from the single signaling bit and the length field based on the following equations:

$$RXTIME = \left\lceil \frac{L_{LENGTH} + m + 3}{3} \right\rceil \times 4 + 20,$$

$$N_{sym} = \left\lfloor \frac{RXTIME - T_{L\_PREAMBLE} - T_{HE\_PREAMBLE}}{T_{sym}} \right\rfloor - SE_{disambiguation\_bit},$$

and $$T_{SE} = \left\lfloor \frac{RXTIME - T_{L\_PREAMBLE} - T_{HE\_PREAMBLE} - (N_{sym} \times T_{sym})}{4} \right\rfloor \times 4,$$

where RXTIME is a duration of the data unit, m is an integer, $L_{LENGTH}$ is the length field, $T_{L\_PREAMBLE}$ is a duration of a legacy preamble, THE PREAMBLE is a duration of a high efficiency preamble, $SE_{disambiguation\_bit}$ corresponds to the single signaling bit, Nsym is the number of data symbols, Tsym is a duration of a data symbol, and $T_{SE}$ corresponds to the selected SE duration.

38. An apparatus for signaling in wireless communications, comprising:
a memory that stores signal extension signaling instructions; and
a processor coupled with the memory and configured to execute the signal extension signaling instructions to:
receive a data unit from a transmitter device;
identify a single signaling bit in the data unit that indicates a signal extension (SE) duration selected for the data unit; and
use the single signaling bit, in combination with a length field, to determine which SE duration from a set of at least three possible SE durations has been selected for the data unit,
wherein the single signaling bit is a disambiguation bit, and wherein using the single signaling bit includes:
calculating a number of data symbols for the data unit;
determining that the disambiguation bit has a value of one; and
reducing the calculated number of data symbols by one based on the value of the disambiguation bit.

39. The apparatus of claim 38, wherein the processor is configured to execute the signal extension signaling instructions to use the single signaling bit to determine the SE duration at least in part by:
determining a number of data symbols for the data unit based at least in part on the single signaling bit; and
determining the SE duration based at least in part on the number of data symbols.

40. The apparatus of claim 38, wherein the set of at least three possible SE durations includes five possible SE durations, and wherein the five possible SE durations includes durations of 0 μs, 4 μs, 8 μs, 12 μs, and 16 μs.

41. The apparatus of claim 38, wherein the single signaling bit is included in an HE-SIG-A or an HE-SIG-B field of a high efficiency preamble associated with the data unit.

42. The apparatus of claim 38, wherein the processor is configured to execute the signal extension signaling instructions to:
identify a decoding boundary for the data unit based at least in part on the SE duration; and
decode the data unit in accordance with the identified decoding boundary.

43. The apparatus of claim 42, wherein the processor is configured to execute the signal extension signaling instructions to identify the decoding boundary for the data unit by mapping the SE duration to a factor indicating a portion of useful bits in a last symbol of the data unit.

44. The apparatus of claim 38, wherein the selected SE duration is determined from the single signaling bit and the length field based on the following equations:

$$RXTIME = \left\lceil \frac{L_{LENGTH} + m + 3}{3} \right\rceil \times 4 + 20,$$

$$N_{sym} = \left\lfloor \frac{RXTIME - T_{L\_PREAMBLE} - T_{HE\_PREAMBLE}}{T_{sym}} \right\rfloor - SE_{disambiguation\_bit},$$

and

-continued
$$T_{SE} = \left\lfloor \frac{RXTIME - T_{L\_PREAMBLE} - T_{HE\_PREAMBLE} - (N_{sym} \times T_{sym})}{4} \right\rfloor \times 4,$$

where RXTIME is a duration of the data unit, m is an integer, $L_{LENGTH}$ is the length field, $T_L$ PREAMBLE is a duration of a legacy preamble, THE PREAMBLE is a duration of a high efficiency preamble, $SE_{disambiguation\_bit}$ corresponds to the single signaling bit, Nsym is the number of data symbols, Tsym is a duration of a data symbol, and $T_{SE}$ corresponds to the selected SE duration.

45. An apparatus for signaling in wireless communications, comprising:
   means for receiving a data unit from a transmitter device;
   means for identifying a single signaling bit in the data unit that indicates a signal extension (SE) duration selected for the data unit; and
   means for using the single signaling bit, in combination with a length field, to determine which SE duration from a set of at least three possible SE durations has been selected for the data unit,
   wherein the single signaling bit is a disambiguation bit, and wherein the means for using the single signaling bit includes:
      means for calculating a number of data symbols for the data unit;
      means for determining that the disambiguation bit has a value of one; and
      means for reducing the calculated number of data symbols by one based on the value of the disambiguation bit.

46. The apparatus of claim 45, wherein means for using the single signaling bit to determine the SE duration determines a number of data symbols for the data unit based at least in part on the single signaling bit, and determines the SE duration based at least in part on the number of data symbols.

47. The apparatus of claim 45, wherein the set of at least three possible SE durations includes five possible SE durations, and wherein the five possible SE durations includes durations of 0 µs, 4 µs, 8 µs, 12 µs, and 16 µs.

48. The apparatus of claim 45, further comprising:
   means for identifying a decoding boundary for the data unit based at least in part on the SE duration; and
   means for decoding the data unit in accordance with the identified decoding boundary,
   wherein the means for identifying the decoding boundary for the data unit maps the SE duration to a factor indicating a portion of useful bits in a last symbol of the data unit.

49. A non-transitory computer-readable medium storing executable code for signaling in wireless communications, comprising:
   code for receiving a data unit from a transmitter device;
   code for identifying a single signaling bit in the data unit that indicates a signal extension (SE) duration selected for the data unit; and
   code using the single signaling bit, in combination with a length field, to determine which SE duration from a set of at least three possible SE durations has been selected for the data unit,
   wherein the single signaling bit is a disambiguation bit, and wherein the code for using the single signaling bit includes:
      code for calculating a number of data symbols for the data unit;
      code for determining that the disambiguation bit has a value of one; and
      code for reducing the calculated number of data symbols by one based on the value of the disambiguation bit.

50. The non-transitory computer-readable medium of claim 49, wherein code for using the single signaling bit to determine the SE duration determines a number of data symbols for the data unit based at least in part on the single signaling bit, and determines the SE duration based at least in part on the number of data symbols.

51. The non-transitory computer-readable medium of claim 49, wherein the set of at least three possible SE durations includes five possible SE durations, and wherein the five possible SE durations includes durations of 0 µs, 4 µs, 8 µs, 12 µs, and 16 µs.

52. The non-transitory computer-readable medium of claim 49, further comprising:
   code for identifying a decoding boundary for the data unit based at least in part on the SE duration; and
   code for decoding the data unit in accordance with the identified decoding boundary,
   wherein the code for identifying the decoding boundary for the data unit maps the SE duration to a factor indicating a portion of useful bits in a last symbol of the data unit.

53. A method for signaling in wireless communications, comprising:
   identifying a signal extension (SE) duration for a data unit from a set of at least three possible SE durations;
   using a single signaling bit in the data unit, in combination with a length field, to indicate the identified SE duration from the set of at least three possible SE durations to a receiver of the data unit;
   outputting the data unit for transmission to the receiver;
   identifying, for a one or more of data units each corresponding to one or more different wireless stations, one or more different SE durations from the set of at least three possible SE durations;
   determining a maximum SE duration from the identified SE duration and the one or more different SE durations identified for the one or more data units, wherein identifying the SE duration for the data unit is based on the maximum SE duration;
   applying the maximum SE duration to the data unit and the one or more data units; and
   outputting the one or more data units for transmission to one or more receivers.

54. The method of claim 53, further comprising using the single signaling bit in each of the one or more data units to indicate the maximum SE duration.

55. The method of claim 53, wherein using the single signaling bit to indicate the identified SE duration comprises setting the single signaling bit to at least one of a first value to indicate that the SE duration is part of a first subset of the set of at least three possible SE durations, or a second value to indicate that the SE duration is part of a second subset of the set of at least three possible SE durations, and wherein at least one possible SE duration value of the set of at least three possible SE durations is included in both the first subset and the second subset.

56. An apparatus for signaling in wireless communications, comprising:
   a memory that stores signal extension signaling instructions; and a processor coupled with the memory and configured to execute the signal extension signaling instructions to:
identify a signal extension (SE) duration for a data unit from a set of at least three possible SE durations;
use a single signaling bit in the data unit, in combination with a length field, to indicate the identified SE duration from the set of at least three possible SE durations to a receiver of the data unit;
output the data unit for transmission to the receiver;
identify, for a one or more of data units each corresponding to one or more different wireless stations, one or more different SE durations from the set of at least three possible SE durations;
determine a maximum SE duration from the identified SE duration and the one or more different SE durations identified for the one or more data units, wherein the processor is configured to execute the signal extension signaling instructions to identify the SE duration for the data unit based on the maximum SE duration;
apply the maximum SE duration to the data unit and the one or more data units; and
output the one or more data units for transmission to one or more receivers.

57. The apparatus of claim 56, wherein the processor is further configured to execute the signal extension signaling instructions to use the single signaling bit in each of the one or more data units to indicate the maximum SE duration.

58. The apparatus of claim 56, wherein the processor is configured to execute the signal extension signaling instructions to use the single signaling bit to indicate the identified SE duration by setting the single signaling bit to at least one of a first value to indicate that the SE duration is part of a first subset of the set of at least three possible SE durations, or a second value to indicate that the SE duration is part of a second subset of the set of at least three possible SE durations, and wherein at least one possible SE duration value of the set of at least three possible SE durations is included in both the first subset and the second subset.

59. A method for signaling in wireless communications, comprising:
receiving a data unit from a transmitter device;
identifying a single signaling bit in the data unit that indicates a signal extension (SE) duration selected for the data unit; and
using the single signaling bit, in combination with a length field, to determine which SE duration from a set of at least three possible SE durations has been selected for the data unit, wherein using the single signaling bit to determine the SE duration comprises:
determining a number of data symbols for the data unit based at least in part on the single signaling bit; and
determining the SE duration based at least in part on the number of data symbols.

60. The method of claim 59, wherein the single signaling bit is included in an HE-SIG-A or an HE-SIG-B field of a high efficiency preamble associated with the data unit.

61. The method of claim 59, further comprising:
identifying a decoding boundary for the data unit based at least in part on the SE duration; and
decoding the data unit in accordance with the identified decoding boundary.

62. An apparatus for signaling in wireless communications, comprising:
a memory that stores signal extension signaling instructions; and
a processor coupled with the memory and configured to execute the signal extension signaling instructions to:
receive a data unit from a transmitter device;
identify a single signaling bit in the data unit that indicates a signal extension (SE) duration selected for the data unit; and
use the single signaling bit, in combination with a length field, to determine which SE duration from a set of at least three possible SE durations has been selected for the data unit, wherein the processor is configured to execute the signal extension signaling instructions to use the single signaling bit to determine the SE duration at least in part by:
determining a number of data symbols for the data unit based at least in part on the single signaling bit; and
determining the SE duration based at least in part on the number of data symbols.

63. The apparatus of claim 62, wherein the single signaling bit is included in an HE-SIG-A or an HE-SIG-B field of a high efficiency preamble associated with the data unit.

64. The apparatus of claim 62, wherein the processor is configured to execute the signal extension signaling instructions to:
identify a decoding boundary for the data unit based at least in part on the SE duration; and
decode the data unit in accordance with the identified decoding boundary.

\* \* \* \* \*

UNITED STATES PATENT AND TRADEMARK OFFICE
CERTIFICATE OF CORRECTION

PATENT NO. : 10,187,314 B2
APPLICATION NO. : 15/159505
DATED : January 22, 2019
INVENTOR(S) : Arjun Bharadwaj et al.

It is certified that error appears in the above-identified patent and that said Letters Patent is hereby corrected as shown below:

In the Claims

Claim 1, Line 9, please delete "signal" and substitute therefor "single";

Claim 1, Line 12, please delete "set";

Claim 10, Line 14, please delete "signal" and substitute therefor "single";

Claim 10, Line 16, please delete "set";

Claim 19, Line 11, please delete "signal" and substitute therefor "single";

Claim 19, Line 13, please delete "set";

Claim 25, Line 12, please delete "signal" and substitute therefor "single"; and

Claim 25, Line 14, please delete "set".

Signed and Sealed this
First Day of July, 2025

Coke Morgan Stewart
*Acting Director of the United States Patent and Trademark Office*